United States Patent [19]

Metcalf

[11] Patent Number: 4,567,609
[45] Date of Patent: Jan. 28, 1986

[54] AUTOMATIC CHARACTER RECOGNITION SYSTEM

[75] Inventor: Travis W. Metcalf, Lemon Grove, Calif.

[73] Assignee: The United States of America as represented by the Secretary of the Navy, Washington, D.C.

[21] Appl. No.: 479,372

[22] Filed: Mar. 28, 1983

[51] Int. Cl.[4] ............................................. G06K 9/34
[52] U.S. Cl. .......................................... 382/9; 382/34; 382/48
[58] Field of Search ..................... 382/9, 32, 48, 52, 34

[56] References Cited

U.S. PATENT DOCUMENTS

| | | | |
|---|---|---|---|
| 3,274,550 | 9/1966 | Klein | 382/32 |
| 3,295,105 | 12/1966 | Gray et al. | 382/48 |
| 3,432,673 | 3/1969 | Mader | 382/48 |
| 3,539,993 | 11/1970 | Hardin et al. | 382/48 |
| 4,097,847 | 6/1978 | Forsen et al. | 382/52 |
| 4,122,443 | 10/1978 | Thaler et al. | 382/48 |
| 4,173,015 | 10/1979 | Owens et al. | 382/9 |
| 4,180,799 | 12/1979 | Smith | 382/48 |
| 4,200,861 | 4/1980 | Hubach et al. | 340/146.3 Q |
| 4,206,442 | 6/1980 | Miyazaki et al. | 382/9 |
| 4,228,421 | 10/1980 | Asada | 340/146.3 |
| 4,254,400 | 3/1981 | Yoda et al. | 340/146.3 MA |
| 4,272,756 | 6/1981 | Kakumoto et al. | 340/146.3 |
| 4,277,775 | 7/1981 | Nally et al. | 340/146.3 Q |
| 4,288,781 | 9/1981 | Sellmer et al. | 340/146.3 |

Primary Examiner—Leo H. Boudreau
Attorney, Agent, or Firm—Robert F. Beers; Ervin F. Johnston; Edmund W. Rusche, Jr.

[57] ABSTRACT

An apparatus and method for automatic character recognition is presented which automatically locates and recognizes alphanumeric characters in a scene viewed by a raster-scan type of sensor. By this method the apparatus can search the entire scene and recognize up to seven alphanumeric characters in a bounded area of known size by the correlation technique in less than 1.5 seconds. The technique used first locates the bounded area and alphanumeric characters and then performs the recognition. Two different feature extraction methods are used to locate the characters in the scene. The recognition function is performed by correlation using an incoherent electrooptical processor.

45 Claims, 10 Drawing Figures

AUTOMATIC CHARACTER RECOGNITION
SYSTEM BLOCK DIAGRAM

FIG.1 AUTOMATIC CHARACTER RECOGNITION
SYSTEM BLOCK DIAGRAM

TYPICAL LICENSE PLATE LAYOUT

FIG.3 LOGIC FLOW CHART

FIG. 4 QUANTIZER BLOCK DIAGRAM

REPRESENTATION OF TWO TV RASTER LINES

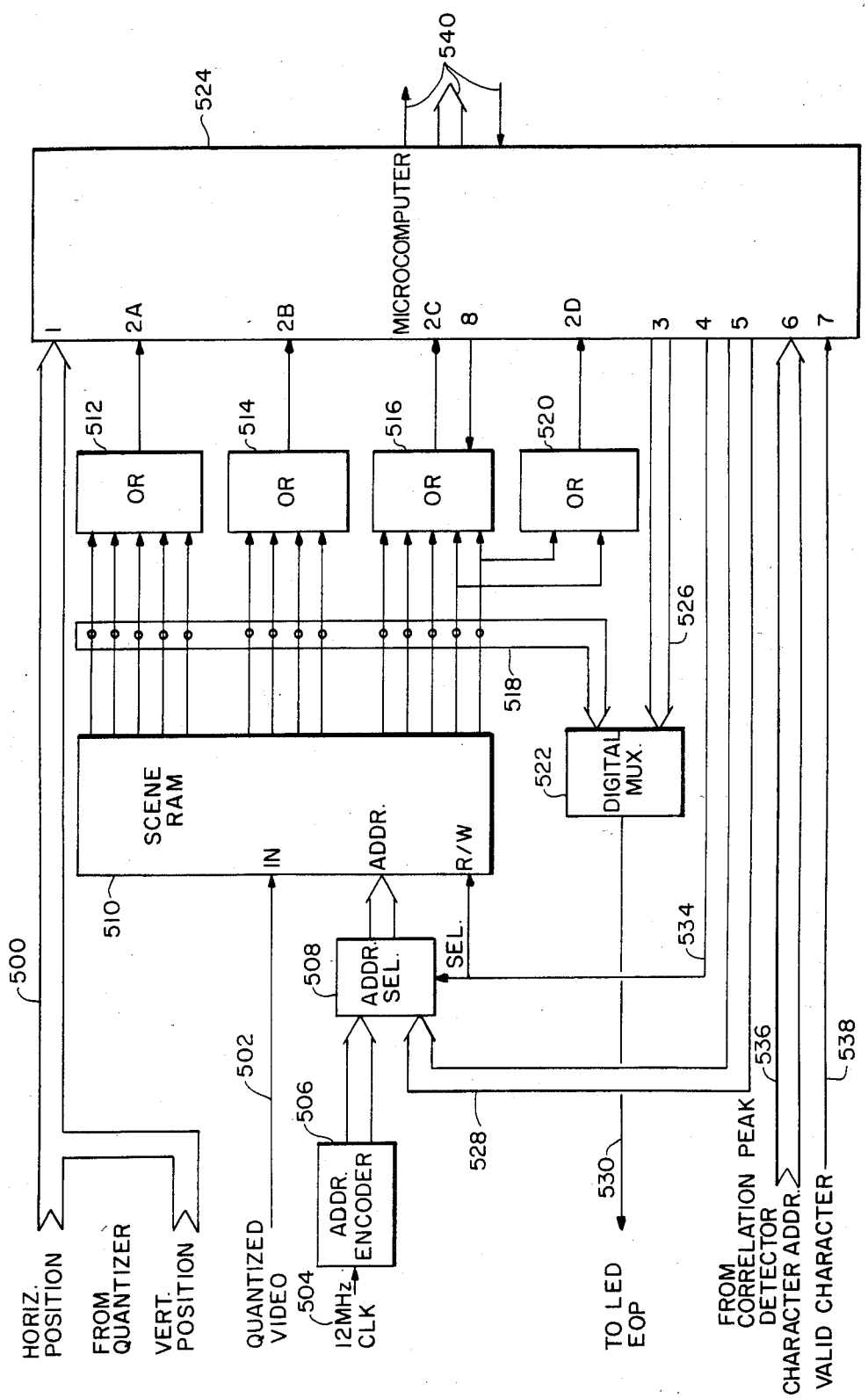
FIG. 6 PLATE LOCATION PROCESSOR

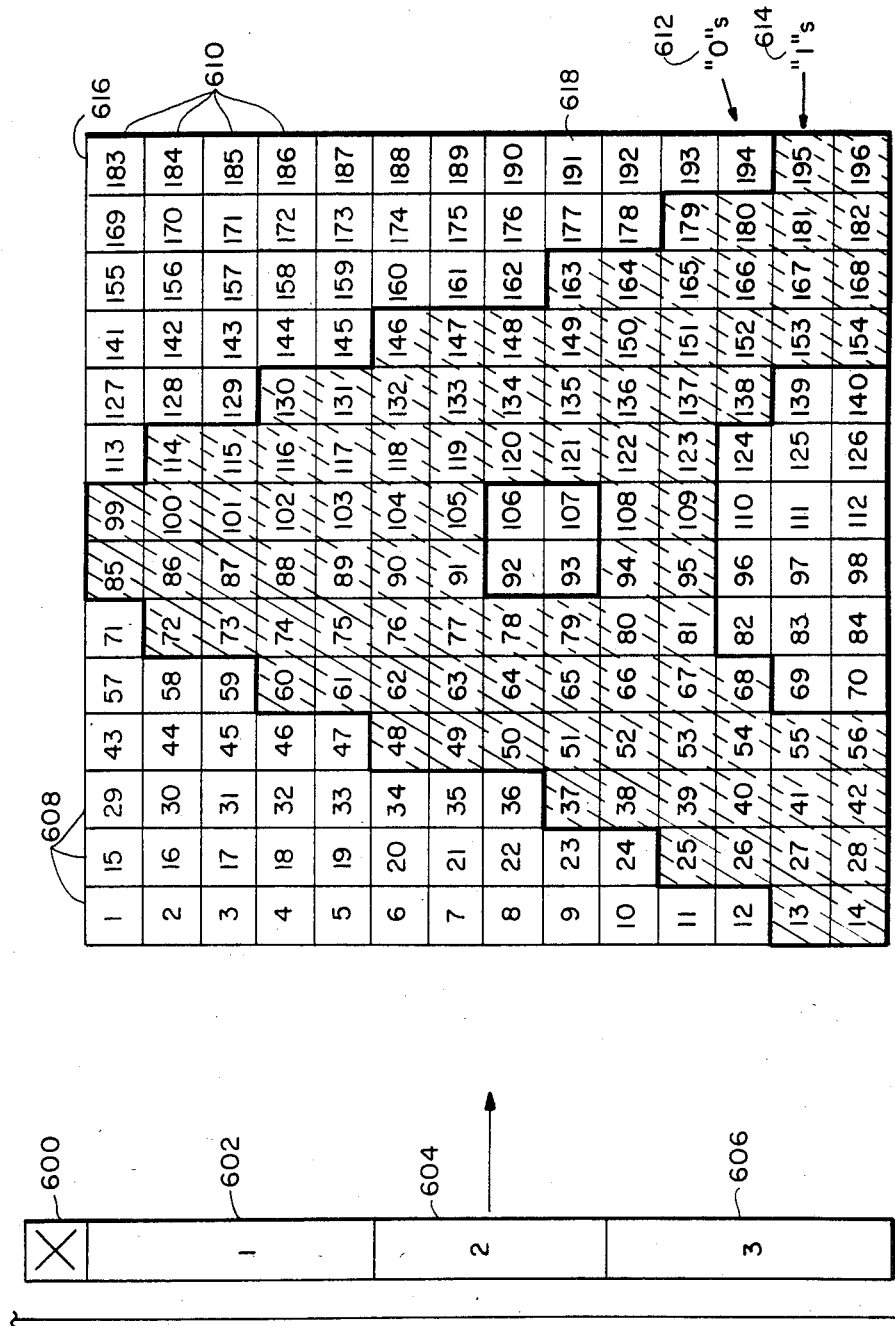
FIG. 7 TYPICAL CHARACTER IN SCENE RAM

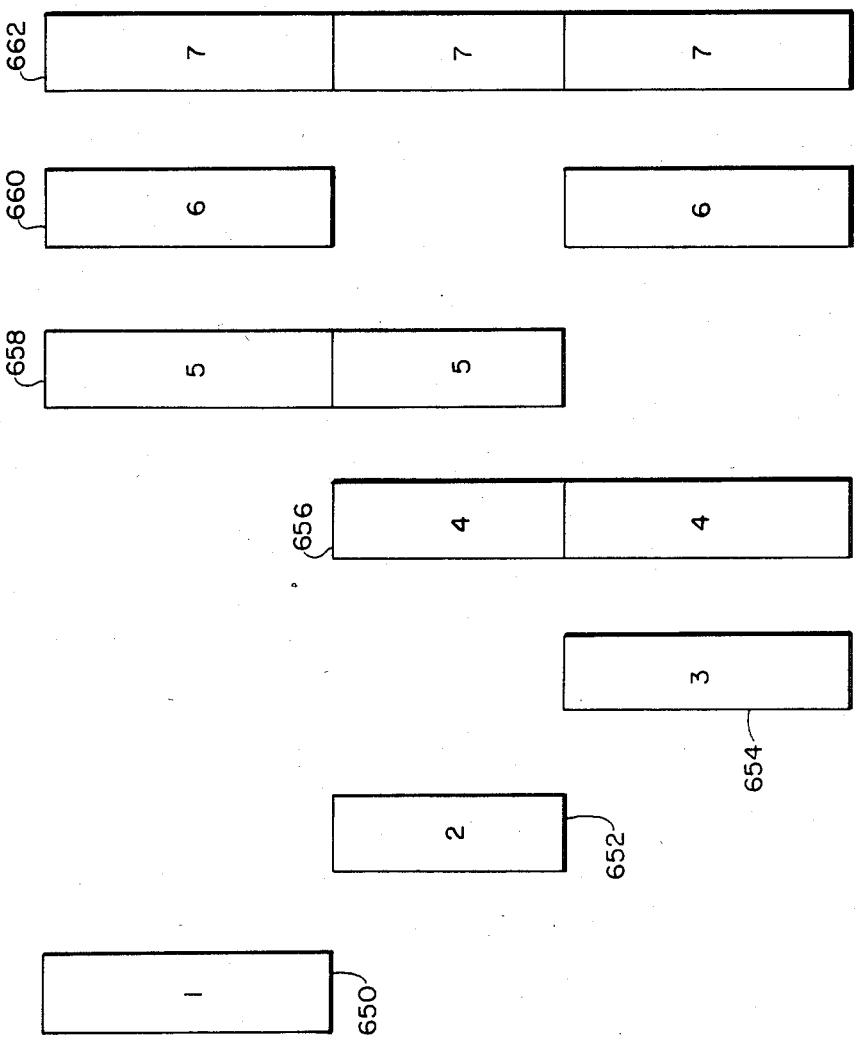
FIG. 8 STATE ASSIGNMENT DIAGRAM

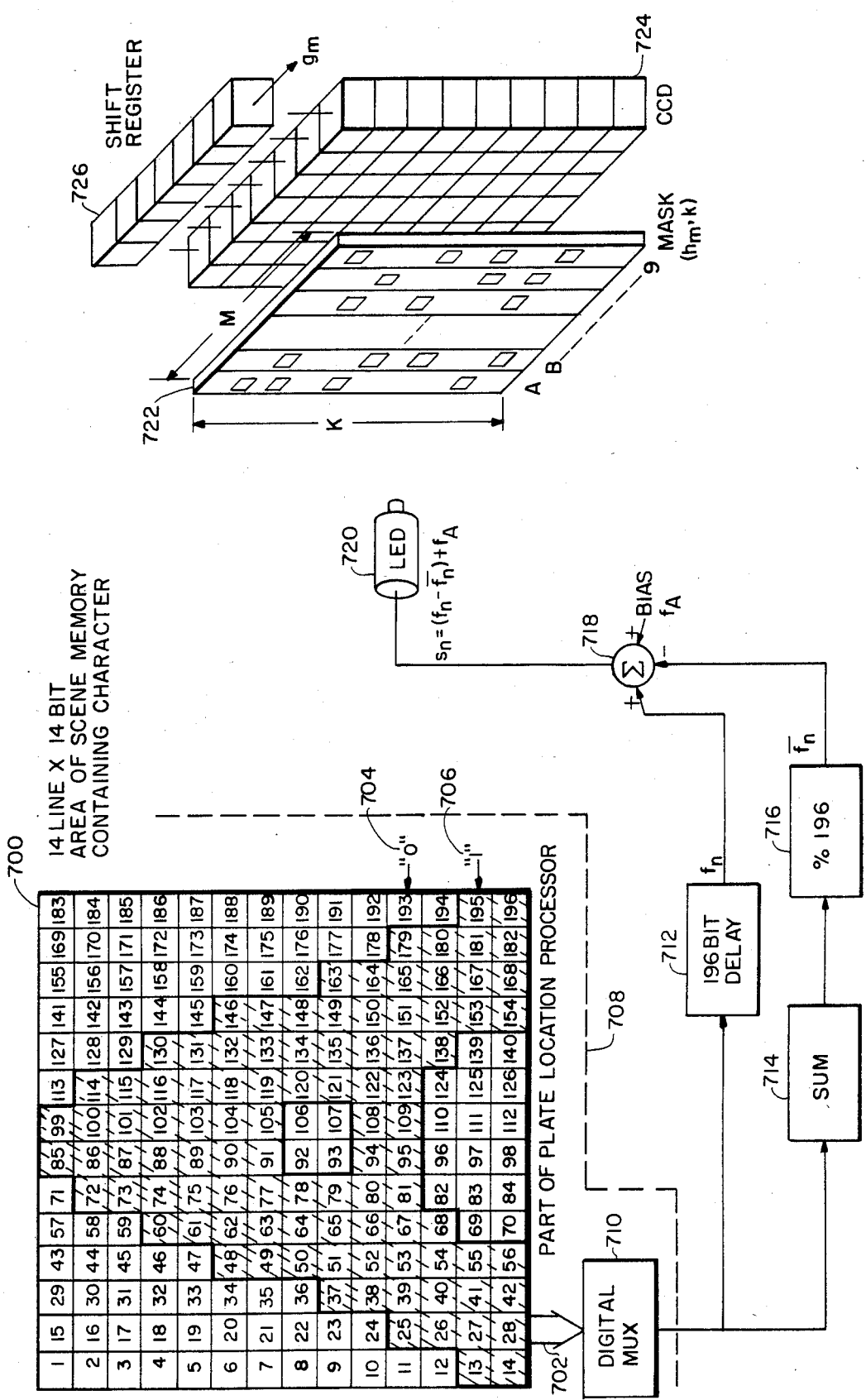
FIG. 9 ELECTRO OPTICAL PROCESSOR

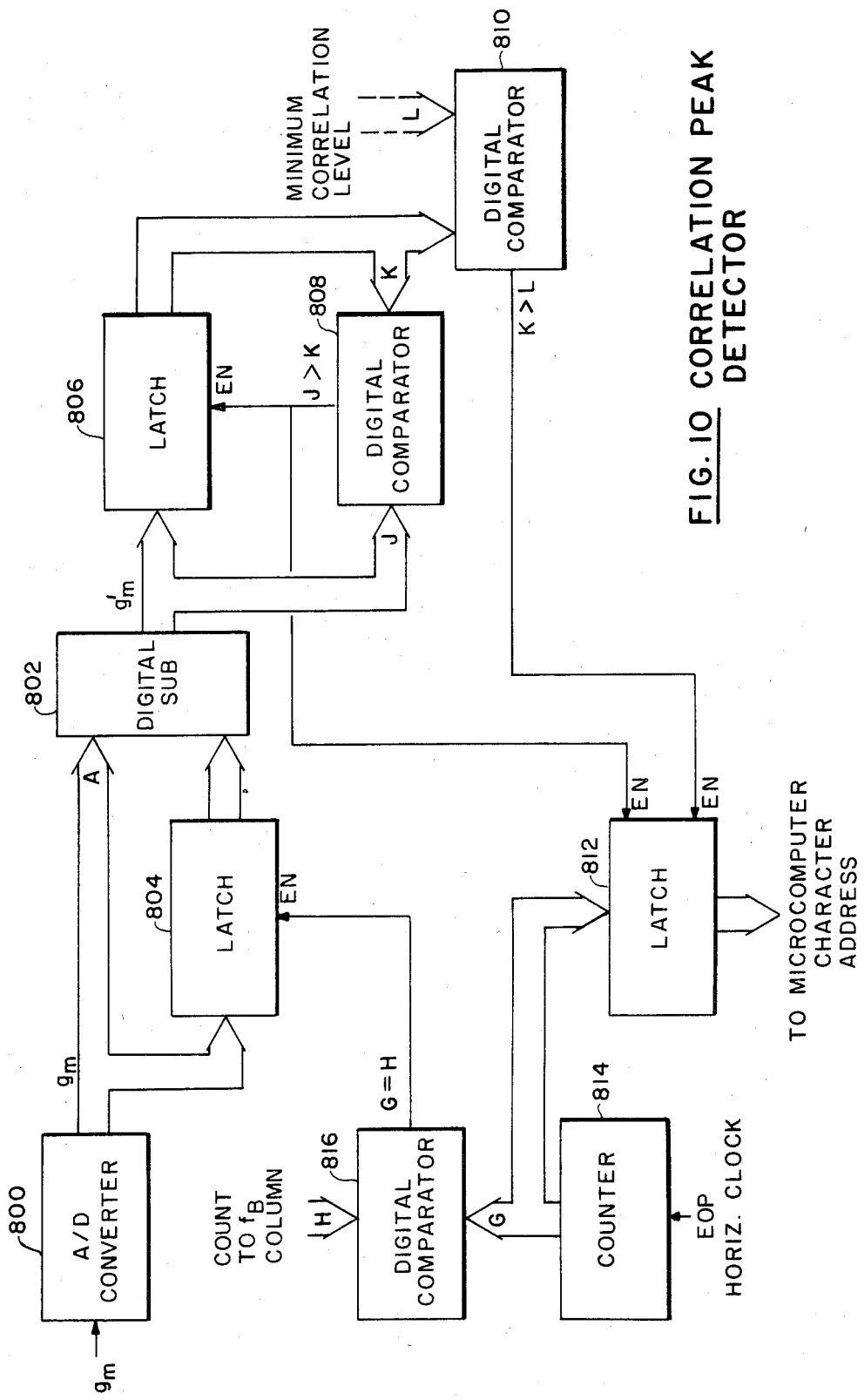
FIG. 10 CORRELATION PEAK DETECTOR

AUTOMATIC CHARACTER RECOGNITION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Optical character recognition has used various methods in the past. Methods used include various forms of feature extraction, flying spot scanners, and correlation techniques. The flying spot scanner approach is limited in that a special non-imaging sensor is utilized and requires the position of the characters to be fairly well controlled. Feature extraction techniques have difficulty with noisy video signals. Correlation approaches work better than other methods of character recognition for noisy signals, but are generally too slow for practical use unless the position of the characters is well known.

In earlier system designs, some required quantizing the input video into two binary levels. In these earlier systems only the edge information was retained. For such schemes the video signal was differentiated, and usually rectified, to produce voltage spikes when the input video level changed. The amplitude of these voltage spikes is a function of how rapidly the video input changes level. Therefore, DC and low frequency information is lost. This quantizing technique causes the noise on the video input to be accentuated and allows the information that exists between the edges of the characters to be lost. The feature extraction concept relies on this information to locate valid characters.

Another technique often used to quantize an analog signal into a two level binary signal involves establishing a threshold level and letting signals above this threshold be "1" and signals below the threshold be a "0". This method works quite well, providing the proper threshold level has been set. If the threshold level is set above or below the portion of the signal to be quantized, the output will remain constant and the information will be lost.

SUMMARY OF THE INVENTION

The invention of this application addresses the general field of optical character recognition. More specifically, it addresses optical character recognition against a bounded and limited constant intensity background area. It is an invention to automatically locate and recognize alphanumeric characters in a scene viewed by a raster-scan type sensor. An example of its application would be the monitoring of automobile license plates from vehicles, moving or stationary.

A complete system based on this invention would comprise a video sensor, a quantizer, a plate location processor, an electro-optical processor, a correlation peak detector, and select peripheral devices for processing detected alphanumeric characters and displaying said characters. The quantizer is a circuit which receives analog video signals from the video sensor, conducts a pre-search test to locate potential areas which are possible license plates containing alphanumeric characters of interest, establishing a background threshold, stores the location of possible license plates, and finally converts the analog signals into binary digital signals. The binary digital signals created are formed in a manner that all data pertaining to likely alphanumeric characters would carry the binary coded signal corresponding to logic "1" while the remainder data which would be associated as background signals would be described by the logical binary code signal "0". This binary coded data is then fed to the plate location processor. In particular, each coded pixel pertaining to the area of an identified potential license plate containing relevant alphanumeric characters is stored in a scene Random Access Memory (RAM). This scene RAM, therefore, contains the video information for all detected possible license plates. Some will be false alerts, and at least one, presumably, has the information of interest.

The plate location processor contains a microcomputer in addition to the scene RAM. The operation of the scene RAM is under control of the microcomputer. The microcomputer aids in the scene RAM receiving the quantized video signals and in transmitting these signals in an organized fashion for further processing in order to recognize and identify the specific alphanumeric characters.

The organized sets of quantized video data from the scene RAM is controlled by the microcomputer to feed an electrooptical processor. The electrooptical processor is a signal processing device consisting of a light emitting diode (LED), a photographic mask, and an area array charge coupled device (CCD). Such a processor can perform a broad variety of useful one-dimensional operations including multi-channel cross-correlation. The electrooptical processing system performs a correlation process upon each signal corresponding to a potential alphanumeric character. Its resultant data is comprised of voltage levels proportional to a correlation function which would be highest for the particular alphanumeric character that is most likely.

The signal from the output of the electrooptical processor is then processed by the correlation peak detector. The correlation peak detector identifies the specific output from the electrooptical processor which has the highest correlation and feeds this information to the microcomputer. The microcomputer takes this information and compares it against a look-up type dictionary which identifies the particular alphanumeric character that has been recognized. Outputs from the microcomputer will feed chosen peripheral devices which can further process the data or display the data in visual fashion to satisfy the user's requirements.

The invention as presented can recognize and identify up to seven alphanumeric characters in each field area pertaining to a potential automobile license plate. In addition, from preset parameters, and telephoto lenses supplied to the video sensor, it is possible to operate the invention for monitoring license plates on vehicles at varying ranges from the video sensor, and on moving vehicles.

OBJECTS OF THE INVENTION

A prime object of the invention is to automatically locate and recognize alphanumeric characters within a bounded area in a scene viewed by a raster-scan type of sensor.

Another prime object of the invention is to provide an apparatus that will search an entire scene and recognize up to seven alphanumeric characters within a bounded area by a correlation technique in less than 1.5 seconds.

Still another object of the invention is the application of the technique to first locate alphanumeric characters within bounded areas and then perform the recognition and identification.

A further object of the invention is to provide a system for locating and recognizing alphanumeric characters on vehicle license plates.

These and other objects, advantages and novel features of the invention will become apparent from the following detailed description of the invention when considered in conjunction with the accompanying drawings.

BRIEF DESCRIPTION OF THE DRAWINGS

FIG. 6 is a block diagram of the plate location processor, i.e., the means for locating a license plate.

FIG. 7 displays a typical character as stored in the scene RAM.

FIG. 8 shows a diagram of the seven state assignments associated with the identification of alphanumeric characters.

FIG. 9 displays the components of the electrooptical processor in a functional manner of processing data from the plate location processor.

FIG. 10 is a block diagram of the correlation peak detector.

DESCRIPTION OF THE PREFERRED EMBODIMENT

The preferred embodiment of the invention presented here is designed to search an entire scene and recognize a bounded subscene of up to seven alphanumeric characters by the correlation technique in less than 1.5 seconds. Particular subscenes of interest are of license plates mounted an automotive vehicles. The new feature is in the technique used to first locate characters within bounded subscenes and then perform the recognition of the characters. Two different feature extraction methods are used to locate license plates containing the characters in the scene. The alphanumeric character recognition is performed by correlation using an incoherent electrooptical processor.

Figure 1:
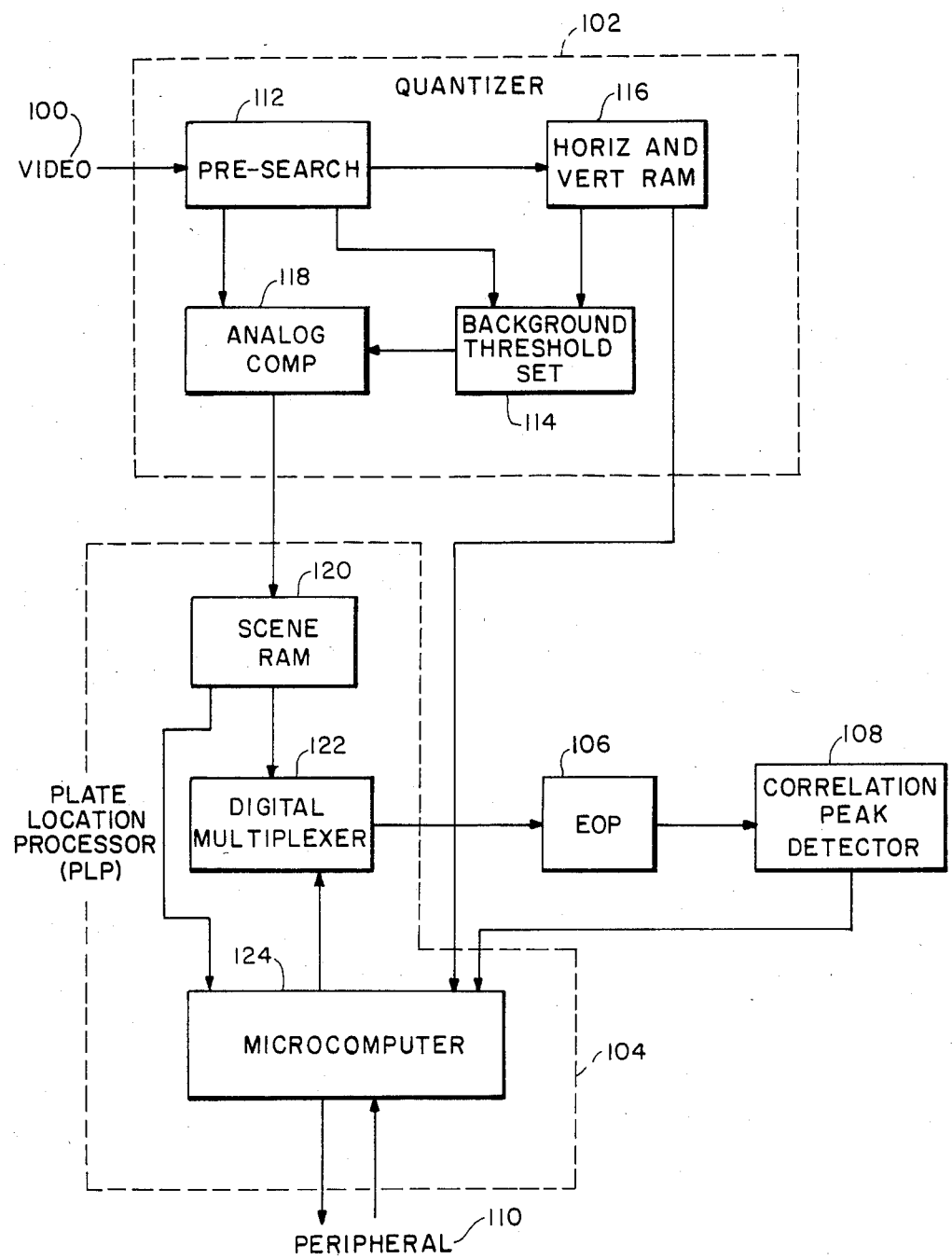
FIG. 1 is a block diagram of the proposed automatic character recognition system.

The block diagram of the proposed automatic character recognition system (ACRS) is shown in FIG. 1. There are four basic components fundamental to the implementation of the concept of this invention. These components comprise a quantizer 102, a plate location processor 104, an electrooptical processor 106, and a correlation peak detector 108. The quantizer 102 receives a video signal 100 and converts the signal into quantized binary logic signals. These quantized binary logic signals are fed to plate location processor 104 where further processing locates a valid license plate in the scene viewed. The quantized data is further fed to electrooptical processor 106 and to correlation peak detector 108 for the purpose of identifying and recognizing the alphanumeric characters located in the scene of interest. In the following discussion we will describe the invention as focusing on the recognition of the alphanumeric characters located on a license plate which may be mounted on a moving vehicle.

Quantizer 102 converts the video signal from the video sensor into a binary signal. A license plate is designed to have considerable contrast between the characters and the background. This difference in contrast is the only information the ACRS requires. Consequently, the gray scale information in the scene is not retained. Accordingly, the video signal is quantized into binary levels.

Normally, if the portion of the video signal that corresponds to a license plate character is more positive (brighter) than the background, the character would then be represented by a logic level "1". If the character signal is more negative than the license plate background, the character would be represented by a logic level "0". However, in order to simplify plate location processor 104 and electrooptical processor (EOP) 106, quantizer 102 is designed to produce an output such that the character will always be represented by a "1" and the background by a "0". This has the advantage of normalizing all license plates from the different States.

Figure 2:
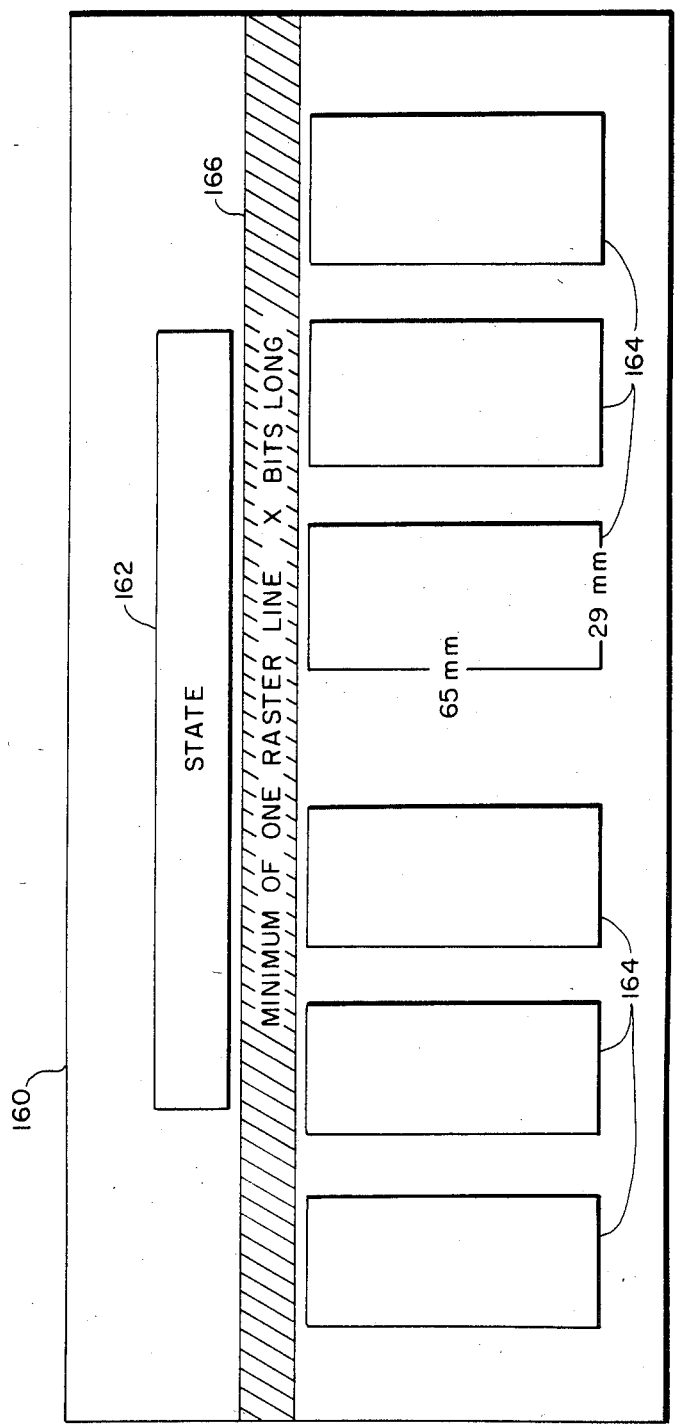
FIG. 2 presents a typical layout of a State automobile license plate which is shown with six areas for containing alphanumeric characters.

The problem of automatically recognizing license plate characters is divided into two tasks. First, the license plate is located. Then, the characters are recognized and identified. The problem of locating a license plate is compounded by several factors. In States that do not use high reflectance paint on their license plate background, the plate background could blend in with the automobile. In some cases it would not be possible to detect the edge or shape of the license plate. In some states, the characters are lighter than the background, while in other states the background is lighter. In addition, the number of characters and arrangement of letters and numerals vary from State to State. The number of characters could be as few as two, or as many as seven. An outline of a typical license plate 160 is shown in FIG. 2. All States have about the same size license plates with approximately the same size alphanumeric characters 164. State title characters 162 are smaller than the alphanumerics of interest and are ignored by the ACRS.

Since the license plate could appear almost anywhere in the scene, it is necessary to search about $4 \times 10^5$ different locations. The search area is first scanned by a presearch technique. The circuit for presearch is shown in FIG. 1 as item 112. As indicated in FIG. 2, there is at least one raster line 166 above the characters 164 in which the video level does not change for the width of license plate 160. The approximate width of the license plate, in horizontal resolution elements is a function of the field of view and distance to the vehicle. This width is assumed known or predetermined for the use of this ACRS. If a segment of video lasts for more than the number of bits expected for the width of the license plate without the level changing, as the serial stream of video is received from the sensor, the area of the scene in which the segment occurs is considered a possible location of the license plate. The raster line number in which the segment occurs is stored in a random access memory (RAM) 116 for later use.

Figure 3:
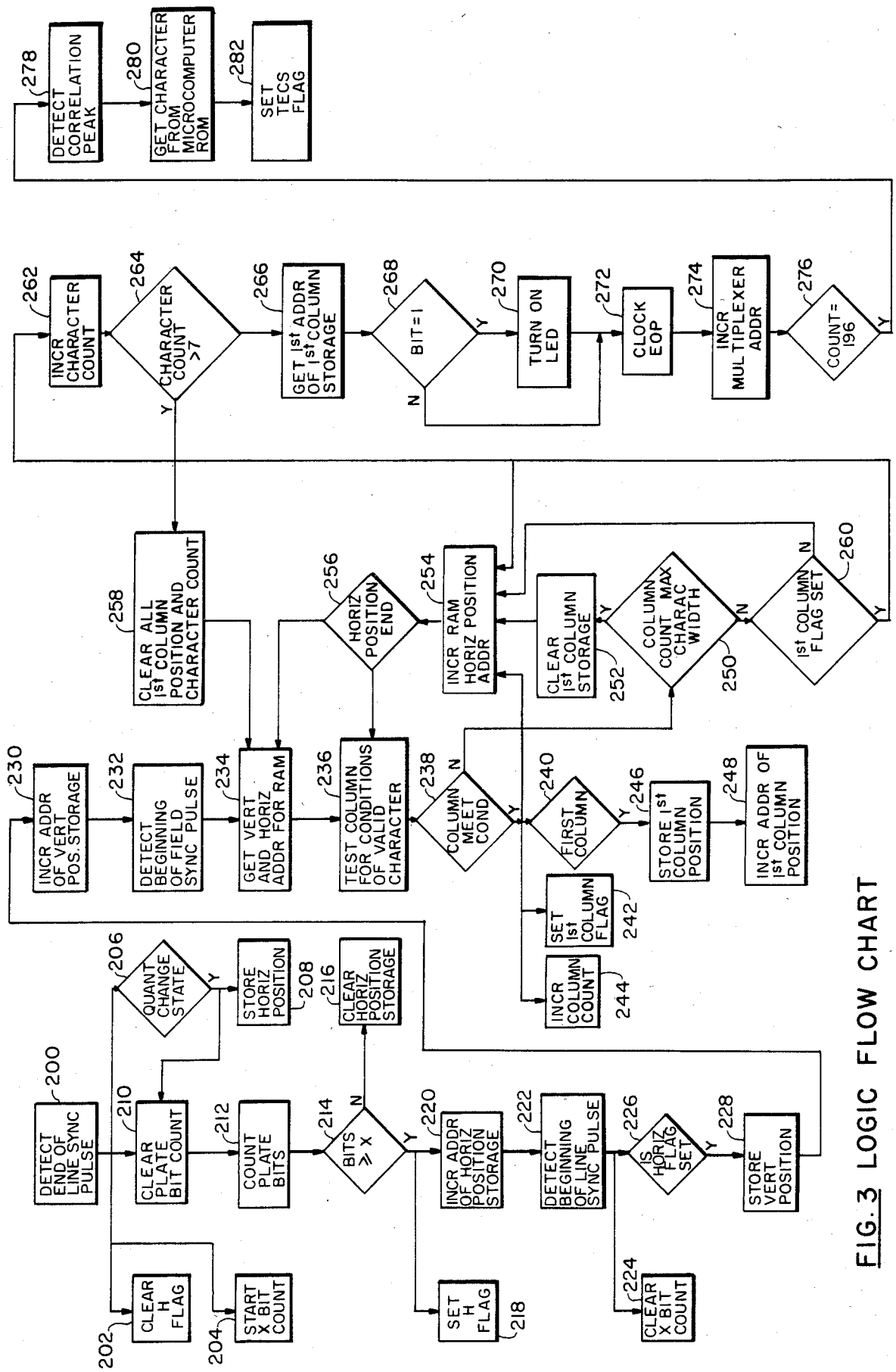
FIG. 3 is a logic flow chart showing the operation of the automatic character recognition system.

FIG. 3 presents a logic flow chart for the operation of this inventive concept. The presearch function performed by presearch circuit 112 is described by logic blocks 200 through 230 in FIG. 3. The presearch circuit 112 of quantizer 102 operates in real time. As frames of quantized video data are being stored in scene RAM (SRAM) 120, the addresses of possible locations of the license plate are being stored in horizontal and vertical RAM 116 located in quantizer 102. This significantly reduces the speed requirements of plate location processor 104.

A feature extraction technique is used to further isolate the position of the license plate to a specific location. The horizontal and vertical position information stored in RAM 116 is used to address SRAM 120. A number of vertical cells or pixels stored in SRAM 120, reference by the horizontal and vertical RAM 116, will be read out in parallel. This number is determined by the number of raster lines the character subtends. To simplify the explanation of operation, the field of view and range is assumed to be such that the characters subtend 14 horizontal raster video lines. Therefore, the SRAM output will be in the form of a 14 element column. The 14 elements are tested to determine if they could belong to a valid character.

If the test on the first column is positive, the adjacent 14 element column to the right is then tested. This process continues until a column is reached in which all elements of the column are at the same logic level. This indicates that a complete character has been scanned.

If the number of columns scanned is less than or equal to the maximum horizontal number that could be subtended by a valid character, and if the logical combination of the 14 element columns correspond to a valid character, the horizontal address is incremented until the next character is encountered to the right.

If between two and seven characters are detected along a horizontal video scan line in a space less than or equal to the width of the license plate, it will be assumed that the license plate has been located. The horizontal and vertical positions of the characters are stored in a microcomputer 124.

If the video information presently being read from SRAM 120 does not meet the criteria for a valid character, the next address stored in horizontal and vertical RAM 116 will be used to address the SRAM to test the next possible license plate location. This process will continue until all locations stored in horizontal and vertical RAM 116 during the presearch mode have been investigated. This feature extraction technique of operation is described by logic blocks 232 through 266 of the logic flow diagram shown in FIG. 3.

After the characters have been located by a combination of the presearch and feature extraction modes of operation, the system enters the recognition mode. The recognition function is performed by EOP 106. As shown in FIG. 9, the EOP consists of a light emitting diode (LED) 720, a mask 722 which contains a reference pattern of several variations for each of the characters, and a charge coupled device (CCD) 724. The EOP performs the mathematical equivalent of correlating the unknown character read out of the SRAM one element (or cell, e.g. 618 in FIG. 7) at a time with all the reference characters stored on mask 722. The correlation peak detector 108 identifies which of the characters on the mask produce the greatest correlation with the processed video signal.

As each character is identified the ACRS can notify a peripheral host computer or other readout device that it is ready to transfer a character. The ACRS will be capable of holding up to seven character addresses while it waits to transfer further data to peripheral components 110.

The logic blocks 268 through 282 in FIG. 3 represent the operation of the EOP, the correlation peak detector, the microcomputers identification of the characters, and setting a signal to notify any peripheral equipment that data is ready for transfer.

Figure 4:
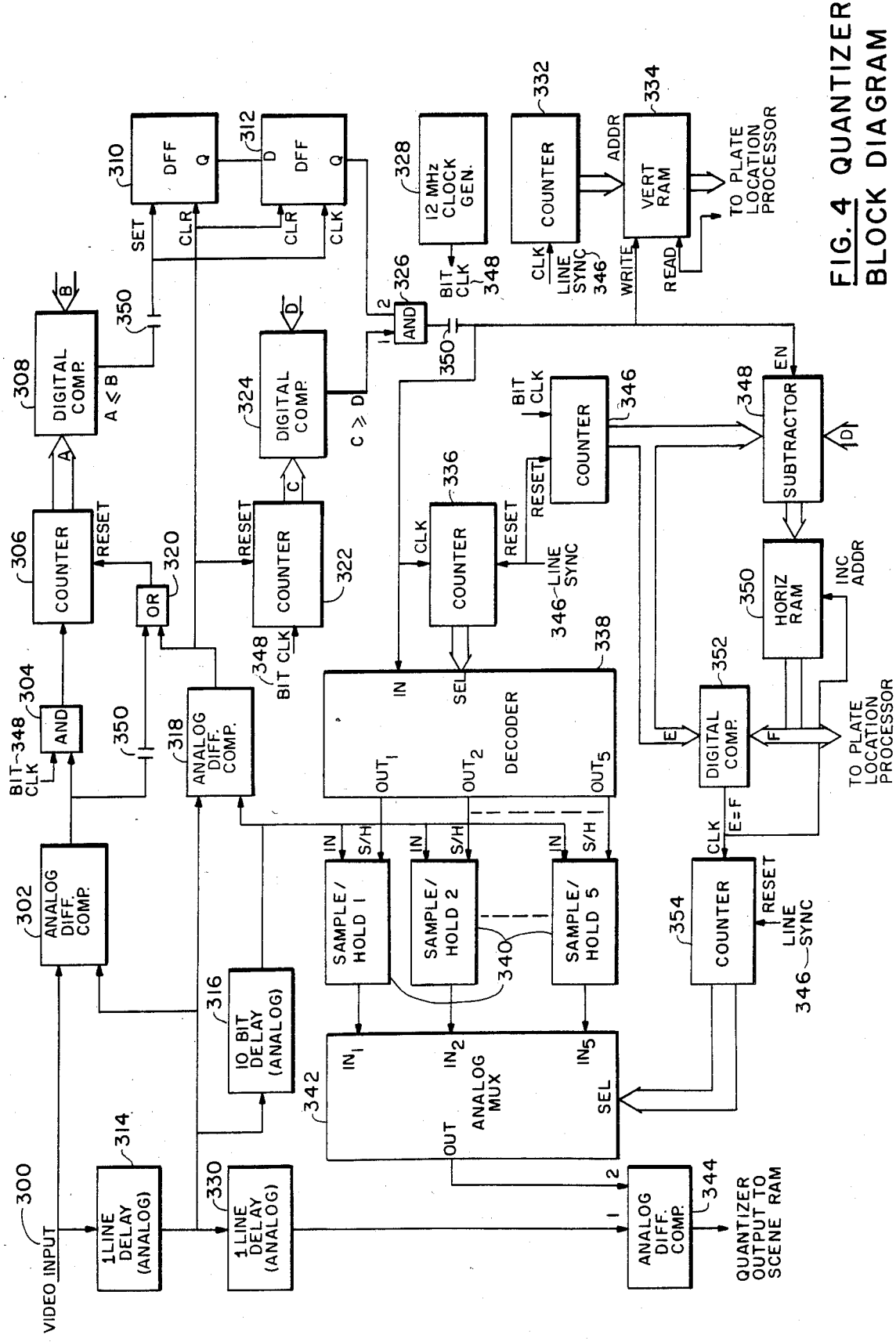
FIG. 4 is a detailed schematic of the quantizer circuit, i.e., the means for converting the video signal into a binary signal.
Figure 5:
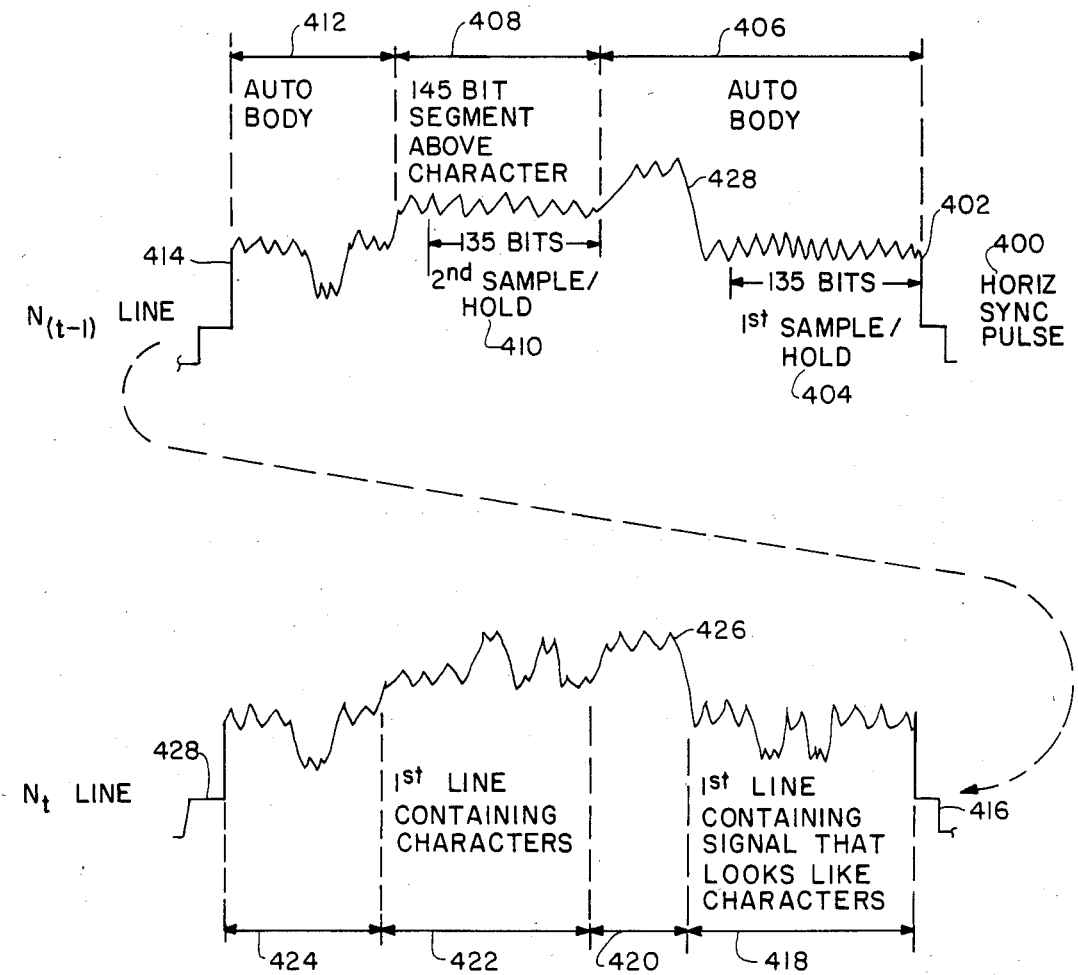
FIG. 5 shows two lines of analog video data as would be received by the quantizing circuit.

A detailed block diagram of the quantizer is shown in FIG. 4. The ACRS requirement to retain the small details of the license plate characters made it necessary to devise a more sophisticated scheme for quantizing the video than those found in other similar systems. FIG. 5 shows a representation of two TV raster lines of video data. The line 428 shown on the top occurred before line 426 shown on the bottom. As indicated in FIG. 2, there will be at least one video line 166 preceding the first line with character information that contains a segment in which no change occurs in the video level. The length of this segment is a function of the sensor's field of view and range. For our purposes of description here, we simply assume the operation occurring so that the length of this segment will correspond to a license plate width equivalent to 145 bits of time or length spacing along the horizontal video scan. Since segment 166 represents the license plate background, the video signal level that occurs thereupon is used to determine the threshold level.

In FIG. 5 a start of the $N_{(t-1)}$ line 402, which will be identified by a horizontal synchronizing pulse 400, precedes reception of the data identified in the top line. The first part of data 406 corresponds to an auto body in this example. Within that segment of data, 135 horizontal bits have been identified as a background sample 404 pertaining to a possible license plate. In the next segment 408, a 145 bit segment above the characters has been picked up wherein another 135 bits of data 410 have been detected as possibly due to a license plate. The remaining section 412 of this horizontal scan displays returns from the auto body. The end of the scan is identified as 414 and the start of the next scan as 416. During the next scan, $N_t$ line 426, the video picks up data just below the prior scan. A first section 418 contains signals that look like characters. Section 420 is auto body. Section 422 is the first line containing characters of the license plate. Section 424 completes the scan with data which represents general characteristics of the auto body, and 428 identifies the end of that horizontal scan.

The video input signal 300 in FIG. 4 is delayed within the quantizer a length of time equal to one horizontal line scan by an analog delay line 314 so the two lines, 426 and 428, shown in FIG. 5, appear at the inputs of an analog differential comparator 302 at the same time. The output of comparator 302 goes high during the time the video level of two consecutive lines are different. This will occur when the first line appears that contains the characters as shown in FIG. 5. The output of comparator 302 is tested by a counter 306 and a digital comparator 308 to verify that the output pulse width does not exceed the width of the valid character. An AND gate 304 receiving the output signal from comparator 302 and a bit clock signal 348 clocks counter 306 to accumulate count designated by A. It is the count A that is compared against a preset count B which determines when the signal equals the expected width of an alphanumeric character.

When the first pulse occurs that does not exceed the maximum width B, the output of comparator 308 goes high and sets a D-flip flop 310 output high. This enables a second D-flip flop unit 312 output to go high on the next valid pulse. Input 2 of an AND gate 326 will be at the high level only after two pulses have been received that do not exceed the width of a valid character.

A second digital comparator 324 compares a counter 322 output of a count quantity C with the preset number D. In the example selected for this description, D equals 145 and corresponds to the width of the license plate. If counter 322 is allowed to count for a segment of time that corresponds to 145 bits before the output of analog differential comparator 318 goes high to reset it, the output of digital comparator 324 goes high. This high level at the output indicates that a 145 bit segment of the video input had no change in the signal level. When this condition occurs, inputs 1 and 2 of AND gate 326 are both high causing gate 326 output to go high. At this point it is determined that there was a corresponding segment of 145 bits that occurred during the previous line without a change in the video level. This condition constitutes a valid segment.

It is conceivable that as many as seven valid segments could occur along a line. The part of the quantizer circuit composed of blocks 336, 338, 340, and 342 is for establishing a threshold level for each valid segment. This part of the quantizer circuit represents the background threshold setting circuit 114 shown in FIG. 1. The probability of seven valid segments occurring along a single line is considered low; therefore, the present circuitry has been designed to only accommodate up to five valid segments per horizontal line. This is represented by the fact that there are five sample/hold circuits 340.

At the beginning of a horizontal line scan, counter 336 has been reset by a line synchronizing pulse 346. After reset, its output selects output 1 of decoder 338 as the output to be connected to its input. When the first valid segment is received, the positive pulse output of AND gate 326 is passed through the decoder 338 to set the sample/hold 1 circuit. This positive pulse commands the first sample/hold circuit to hold the signal voltage level at the output of an analog delay circuit 316. The first data sample on the waveform is indicated as 404 in FIG. 5.

The same sample command signal from AND gate 326 also increments counter 336. Decoder 338 will now connect its output 2 to its input. If a second valid segment occurs on the same horizontal line, a sample command signal will be passed through decoder 338 to a second sample/hold circuit 340. This sample command signal commands the sample/hold 2 circuit to sample the output of delay 316 and to hold the signal voltage level of that output. In reference to FIG. 5 a second valid segment occurs at segment 410. Again, the sample command signal also increments counter 336 and decoder 338.

The 10-bit analog delay circuit 316, analog differential comparator 318, and an OR gate 320 are used to reset counter 306, counter 322, and D-flip flops 310 and 312; this circuit allows for the detection of noisy signals not subject to conditions necessary to trigger AND gate 326 and cause signals to be sent to the respective counters in the D-flip flop units to clear or reset them for restarting a new test cycle.

A counter 346, a subtractor 348, a horizontal RAM 350, a digital comparator 352, and a second counter 354 perform the task of keeping track of the horizontal positions at which the valid segments occur. Counter 346 counts the 12 MHz signal bits emitted by a clock generator 328 for the duration of the horizontal scan line. After a valid segment occurs subtractor 348 subtracts 145 bit counts from the output of counter 346. The subtraction is performed in order that the position of the beginning of a segment can be stored in RAM 350, rather than the end of the segment. In subsequent lines, the position F of the valid segments, stored in the RAM 350, are fed to the input of digital comparator 352. When the count output E of counter 346 matches position F as read out of RAM 350, digital comparator 352 output goes high and increments the count of counter 354. This causes an analog multiplexer 342 to select the next sample/hold circuit output for the threshold reference volage. The voltage levels at the outputs of the samples/hold circuits are the threshold signal levels against which the video input signal will be compared by an analog differential comparator 344.

The video input signal 300 is delayed a second period equal to one horizontal scan by an analog delay circuit 330. The signal is then fed to input 1 of analog differential comparator 344 to be compared with the output of multiplexer 342. Analog differential comparator 344 will provide a positive (logic level "1") signal if the delayed video input into terminal 1 is above or below the threshold signal from multiplexer 342 by a specific margin. This technique has the effect of normalizing all license plates. The quantizer output will be positive whenever a character appears regardless of whether the character is lighter or darker than the license plate background.

A counter 332 and a vertical RAM 334 are used to keep track of the scan line number (or vertical position) at which a valid segment occurred. Counter 332 is indexed by line synchronizing pulses 346. The horizontal and vertical location data for possible license plate segments stored in RAMs' 334 and 350 is also made available to the plate location processor for further use. This data is likewise represented as stored in horizontal and vertical RAM 116 in FIG. 1.

The plate location processor block diagram is shown in FIG. 6. In FIG. 1 the major components of plate location processor 104 were shown as SRAM 120, a digital multiplexer 122, and microcomputer 124. FIG. 6 expands in detail on the structure of the plate location processor.

In FIG. 6, we find that a major component is microcomputer 524. The microcomputer receives data and controls the functions of the other units in the plate location processor as well as some units outside of this processor. Interconnection and communication with peripheral devices will also occur from the microcomputer.

It is seen in FIG. 6 that horizontal and vertical position data stored in horizontal and vertical RAM 116 in the quantizer is fed directly to microcomputer 524 via path 500. Quantized video data is fed into SRAM 510 (item 120 in FIG. 1). Also connected to the SRAM is an address encoder 506 and an address selector 508.

In this embodiment four OR gates, gates 512, 514, 516, and 520, are positioned to receive data from SRAM 510 and to feed outputs to microcomputer 524.

A digital multiplexer 522 intercepts data emitted from scene RAM 510 via path 518 and upon receiving data and commands via path 526 from microcomputer 524 controllably transmits the data serially along path 530 to the LED of the electrooptical processor. Other data and command paths exist between various units and the microcomputer, e.g., a path 528 to address selector 508, a control path 534 to address selector 508 and SRAM 510, a character address path 536, and a valid character path 538 from the correlation peak detector.

The bulk of the processing required by the feature extraction technique of locating the license plate will be performed in conjunction with the microcomputer. During the time a frame of video is being loaded into SRAM 510 from the quantizer, the microcomputer commands address select 508 via path 534 to address the SRAM from address encoder 506. The SRAM is organized into 1,000 cells per row and 424 rows. At the same time that the quantized video information is being loaded along path 502 into the SRAM, the horizontal and vertical position of the valid segments are being fed to the microcomputer along path 500.

The horizontal and vertical positions are also loaded into the SRAM and represent the address of a single pixel located in an area of the scene that could be the left edge of a possible license plate on the line above the characters. This is represented by a cell $\overline{X}600$ in FIG. 7. FIG. 7 also schematically shows how the character "A" may appear as stored in cells in the SRAM. The background will always be at the logic level "0" (612) and each element of the character will be at the logic level "1" (614). There are 14 columns 608 in this display of a character and 14 rows 610. A particular cell is represented by 618 and the scene of the character contains, for this example, 196 cells.

At the end of the frame, the microcomputer commands address selector 508 to address the SRAM from the microcomputer. A 14-element column, such as any of columns 608 of FIG. 7, is read out of the SRAM simultaneously with elements' location data specified by the quantizer at the top of the column, 600. FIG. 7 shows that the column of elements are separated into three groups, group 1(602), group 2(604), and group 3(606). The top, 602, and bottom, 606, groups contain 5 elements, the center, 604, group contains 4 elements. The elements of the top group are "ORed" together by an OR gate 512 of FIG. 6, the second group by an OR gate 514, and the third group by an OR gate 516. As column address 600 of the SRAM is incremented to the right, eventually there will be a column read out that contains at least one element at logic level "1". This column will be assigned a state number as indicated in FIG. 8. FIG. 8 shows 6 state assignments. A seventh, the null state, or trivial state, is not shown. Each of these states, 650 through 662, represent combinations on vertical columns where the various groups, group 1 through 3 as shown in FIG. 7, will contain one or more logic level "1" elements.

Using the character "A", (FIG. 7), as an example, the first "1"s encountered occur in elements 13 and 14 of the first column. Referring to FIG. 8 the ones appear only in the group 3(606) or state 654. Therefore the first column is assigned the state 3(654). The SRAM is again incremented and the next column is read out. The microcomputer tests the outputs of the OR gates and determines that "1"s again occurred in group 3(606) which corresponds to state 3. Columns 3 and 4 have "1"s that appear in groups 2(604) and 3(606). This corresponds to state 4(656) of FIG. 8. This process continues until a column is reached in which all the elments are the "0" level. This indicates that a complete character has been scanned.

The microcomputer determines if the sequence of assigned states is proper for a valid character. If the character is determined valid, the microcomputer stores the location of the first column of the character and proceeds to the next character. After all the characters have been located the microcomputer will again address the SRAM to read out the first column of the first character.

The microcomputer will control multiplexer 522, FIG. 6, such that all 14 outputs of the SRAM will be sequentially connected to the LED 720 located in the EOP. This process continues until all the elements of the array containing the character have been connected to the LED.

An OR gate 520 is used to monitor the bottom two elements of each column. In some instances, a license plate holder will overlap the bottom of the characters. This condition could cause the microcomputer to reject a valid character. The microcomputer monitors the output of OR gate 520. If this output remains high continuously, the microcomputer issues a command for gate 516 to ignore the bottom two elements.

The basic components of the electrooptical processor are shown in FIG. 9. The EOP is a signal processing device consisting of LED 720, photographic mask 722, and area-array charge couple device (CCD) 724. In addition, a shift register 726 is connected at the top of CCD 724. Such a processor can perform a broad variety of useful one-dimensional operations including multichannel cross-correlation.

A fixed masked processor currently produced uses a Texas Instrument TIXL12 P-N Gallium Arsinied Infrared emitting diode and an off-the-shelf RCA SID 52501 CCD imager. The CCD consists of 320 columns in 512 rows, and has an output signal to noise ratio of 50 db.

Multiplexer 522 in FIG. 6 takes the output of each memory cell in matrix 700 of FIG. 9 in the sequence indicated by the cell numbers, and after some modification of the signal, applies it to LED 720. As shown in FIG. 9, the second column of the scene memory matrix is being fed along path 702 to digital multiplexer 710 (522 in FIG. 6), and is thereafter subjected to parallel paths where the quantity $s_n$ is calculated electrically. This is accomplished through a 196 bit delay circuit 712, a summing unit 714, a divid by 196 unit 716, and a second summation unit 718. Summation unit 718 adds and subtracts the proper voltages to form the function, $$s_n = (f_n - \overline{f}_n) + f_A,$$

where $f_A$ is a bias voltage and $\overline{f}_n$ is the average value of $f_n$.

The irradiance of LED 720 illuminating the photographic transparency 722 is directly proportional to the input signal $s_n$ and is spatially uniform across the entire surface of the mask. The transparency contains an M by K array of elements with optical transmittance values $h_{m,k}$ arranged in a geometrical pattern and scale identical to that of the photosite array in CCD 724. Since the irradiance transmitted by a transparency is the product of the illuminating irradiance times the intensity transmittance of the mask, the light distribution immediately behind the m,kth element of the transparency at time n is given by $(s_n)(h_{m,k})$. Assuming that the mask and the optically sensitive area of the CCD are in physical contact and registered such that the m,kth cell of the transparency is superimposed on the m,kth element of the CCD, then this irradiance pattern is detected by the CCD and stored as an M by K array of analog charge packets.

By the nature of charge transfer technology, the application of clocking waveforms to the CCD electrode structure causes potential wells to "move" in such a way that these charge packets are shifted along the CCD structure (upward in the orientation of FIG. 9). While the exact nature of these waveforms varies from manufacturer to manufacturer and from one model to the next, let us assume that the appropriate clocking pulses are provided so as to shift these charge packets vertically at a rate of $V_{ver}$ CCD cells/sec. Let us further stipulate that $V_{ver} = V_{in}$, i.e., that the vertical shift rate is the same as the input signal sample rate. As these charge packets travel upward, more and more charge is added to them due to the time-varying pattern illuminating CCD 724. The net result is that each column of the CCD performs a running sum of the products of the time-varying LED radiance and the space-varying transmittance values of that column of mask 723. In particular, let us consider the k=nth row of these charge packets. As this row travels from bottom (k=n=1) to top (k=n=K), its charge values take on the form, $$\sum_{n=1}^{k} (s_n)(h_{n},n) = g_m \quad (1)$$

where
$s_n = (f_n - \bar{f}_n) + f_A$
$\bar{f}_n$ = average character signal level
$f_n$ = memory cell signal level
$f_A$ = added bias signal This equation can equivalently be considered as a matrix-vector multiplication, i.e., $$[h_{m,n}][s_n] = [g_m] \quad (2)$$

The CCD chip contains a parallel-to-serial converter (physically just a horizontal linear CCD shift register 726 with M input taps) and an on-chip amplifier so that this M-element vector can be read out of the CCD chip as a time-varying analog voltage waveform. It is important that the shift rate, $V_{hor}$, of this horizontal shift register be at least M times the shift rate of the vertical CCD registers in order that it be empty by the time the next row of charge packets, namely $g_m, n+1$, are ready to be read out. Thus, for the processing mode of CCD operation, $$V_{in} = V_{ver} < \frac{V_{hor}}{m} \quad (3)$$

The CCD currently used has a maximum horizontal clock rate ($V_{hor}$) of 10.24 MHz and contains 320 columns. Therefore, the maximum input data rate is 32 KHz.

Considering the charge packets accumulated in the mth column of the CCD, equation 1 takes the form $$g_m = \sum_{n=1}^{k} s_n h_n = \sum_{n=1}^{k} [(f_n - \bar{f}_n) h_n + f_A h_n] \quad (4)$$

which is a variation of the well-known cross-correlation function $$C = \frac{\sum_{n=1}^{k} (f_n - \bar{f}_n)(h_n - \bar{h}_n)}{\left[\sum_{n=1}^{k} (f_n - \bar{f}_n)^2\right]^{\frac{1}{2}} \left[\sum_{n=1}^{k} (h_n - \bar{h}_n)^2\right]^{\frac{1}{2}}} \quad (5)$$

The factor $h_n$ in equation 4 is the intensity transmittence of the mask at location column m, row n. To make this factor the same as the corresponding factor in equation 5, it will be necessary to subtract the average intensity transmittance of the background and character ($\bar{h}_n$) of the mask. This can be easily accomplished at the time the mask is developed.

It is important to realize two restrictions which the use of incoherent optics places on the implementation of equation 1. First, light intensity is a positive-only (i.e., non-negative) quantity. Thus the input signal $s_n$ must be positive so that it can be adequately represented by the radiance of LED 720.

The second factor is that the intensity transmittance of mask 722 is also a positive-only quantity. Thus the elements of the mask matrix ($h_{m},k$) must also be positive quantities in order to be adequately represented as transmittances of the photographic mask. These shortcomings may be handled by adding a bias to both the signal applied to the LED and to the matrix elements ($h_{m},k$).

After taking into account the average input ($\bar{f}_n$), the average intensity transmittance ($\bar{h}_n$) and the LED and mask biases, the EOP output is given by $$g_m = \sum_{n=1}^{k} (f_n - \bar{f}_n)(h_n - \bar{h}_n) + \sum_{n=1}^{k} (f_n - \bar{f}_n + f_A)f_B + \sum_{n=1}^{k} (h_n - \bar{h}_n)f_A \quad (6)$$

The factor $(f_n - \bar{f}_n + f_A)f_B$ is a function of the input but can be subtracted out of $g_m$ by making all elements of one of the columns be $f_B$. The term $(h_n - \bar{h}_n)f_A$ is a fixed constant and can be ignored.

After substracting the term $(f_n - \bar{f}_n + f_A)f_B$ and ignoring the $(h_n - \bar{h}_n)f_A$ term, $$g'_m = \sum_{n=1}^{k} (f_n - \bar{f}_n)(h_n - \bar{h}_n). \quad (7)$$

Equation 7 still differs from a true correlation function by the denominator factors $$\left[\sum_{n=1}^{k} (f_n - \bar{f}_n)^2\right]^{\frac{1}{2}} \left[\sum_{n=1}^{k} (h_n - \bar{h}_n)^2\right]^{\frac{1}{2}}$$

of equation 5.

These factors have the effect of normalizing the correlation function. In order to implement the factor containing $f_n$, it would be necessary to use an additional LED, mask, and CCD. Since the character can be recognized by detecting which of the columns have the largest output, it is not necessary to normalize the correlation function.

The $\bar{f}_n$ term is obtained by summing the outputs of all 196 memory cells with SUM 714, shown in FIG. 9, then dividing by 196(716). Since the average term ($\bar{f}_n$) must be calculated before it can be subtracted from the $f_n$ term, $f_n$ is delayed for 196 bits (the time required to average all 196 memory cell bits) by delay circuit 712.

The correlation peak detector block diagram is shown in FIG. 10. An A/D converter 800 converts the analog output of shift register 726 on CCD 724 to digital signal for ease of processing. When the output of the A/D converter 800 corresponds to the output of the first CCD column ($f_B$), $$g_m = \sum_{n=1}^{k} (f_n - \bar{f}_n + f_A)f_B.$$

The summation $$\sum_{n=1}^{k} (f_n - \bar{f}_n + f_A)f_B$$

is complete after 196 vertical shift pulses, or $(196) \times (320) = 62720$ horizontal shift pulses. After a counter 814 has counted 62720 EOP horizontal clock pulses, the output of a comparator 816 goes high and commands a latch 804 to hold the value of $g_m$.

In subsequent values of $g_m$, $$\sum_{n=1}^{k} (f_n - \bar{f}_n + f_A)f_B$$

is subtracted from $g_m$ by a digital subtractor 802 to provide the approximate correlation function $g'_m$.

A digital comparator 808 continuously compares the new correlation level $g'_m$ with the old level set into a latch 806. When the new $g'_m$ exceeds the old level the output of comparator 808 goes high and sets the new value of $g'_m$ into latch 806. Simultaneously, the column position, which corresponds to the character with the highest correlation level, is set into a latch 812.

It is possible that parts of the scene that are not valid characters can produce a low correlation output. A digital comparator 810 compares present peak correlation level with a minimum correlation level. If this minimum is not exceeded, comparator 810 will inhibit latch 812 from transferring the column position information to the microcomputer.

In addition to the processing performed by the microcomputer as described earlier, microcomputer 524 shown in FIG. 6 also uses the character address information 836 from the correlation peak detector (assuming a valid character signal has been received) to address an internal ROM containing all the characters. The microcomputer also notifies any peripheral equipment 540 that a character is ready to be transferred. When a transfer signal is received from the peripheral equipment, the character is read out of ROM in either serial or parallel format as required.

Obviously many modifications and variations of the present invention are possible in the light of the above teachings. It is therefore to be understood that within the scope of the appended claims the invention may be practical otherwise than as specifically described.

What is claimed is:

1. An apparatus for automatic location and recognition of alphanumeric characters in a bounded area of known size within a scene viewed by a raster-scan type video sensor which comprises:

means, connected to receive a video signal from the raster-scanned type sensor, for converting said video signal into a digital binary signal whereby the alphanumeric characters are represented by one of the binary signals and the background data is represented by the other binary signal;

means, disposed to receive the output of the converting means, for locating a known bounded area containing alphanumeric characters in the scene viewed;

means, connected to the locating means, for recognizing the alphanumeric characters contained in the known bounded area; and means, disposed to receive the output of the recognizing means, for further processing and displaying of the recognized alphanumeric characters;

wherein the converting means comprises:

means, disposed to receive the analog video signal from the video sensor, for presearching the scene viewed to locate probable bounded areas containing alphanumeric characters, wherein said means for presearching identifies horizontal and vertical coordinates representing the location of each probable bounded area containing alphanumeric characters;

means, connected to receive a signal from the output of the presearching means, for setting a threshold to represent the background signal level;

means, connected to the presearching means, for storing the horizontal and vertical coordinates representing the location of each probable bounded area containing alphanumeric characters; and means, connected to receive the analog video signal from the video sensor and also connected to receive the output analog signal from the threshold setting means, for digitizing those signals pertaining to probable bounded areas containing alphanumeric characters in a manner that signals pertaining to alphanumeric characters are set as a first binary coded signal level and the background signals are set at the second binary coded signal level;

the apparatus further comprising:

a threshold setting means which adjusts the threshold reference signal to relate in an absolute manner to analog signals pertaining to probable alphanumeric characters in a manner that possible alphanumeric characters are always treated similarly in relation to the background level whether the alphanumeric characters are light colored on a dark background or dark colored on a light background; and an analog comparator as the digitizing means, said analog comparator outputting a digital logic binary signal of "1" for data pertaining to alphanumeric characters and a digital logic signal of "0" for data caused by background signals;

wherein the presearching means comprises:

an input for receiving the video signals from the video sensor;

a bit clock generator;

a first analog delay circuit connected to receive the video sensor input, said delay circuit causing a delay of time length equal to one horizontal video line scan;

a first analog differential comparator which receives input signals from the first analog delay circuit and from the video sensor input, said comparator outputting a signal when the input signals differ;

a first AND gate which receives one input from the bit clock generator and a second input from the output of the first analog differential comparator, said AND gate emitting an output signal when signals occur simultaneously at both inputs;

a first counter connected to receive the output of the first AND gate, said counter accumulating a total count representing the period during which the first AND gate is outputting a pulse signal;

a first digital comparator connected to receive the count output (A) from the first counter and to compare this accumulating count against a preset test count (B) which represents the expected horizontal width of a single alphanumeric character, said comparator outputting a signal when A is less than or equal to B;

a first D-flip flop unit connected to receive the output signal from the first digital comparator, said flip flop unit outputs a signal after it has been triggered by a first output signal from the first digital converter;

a second D-flip flop unit connected to receive the output of the first D-flip flop unit and to receive the output signals from the first digital comparator, said second D-flip flop unit being activated by the output signal from the first D-flip flop unit which occurs when the first flip flop unit is activated by the first output signal emitted from the first comparator, and then is caused to emit a signal at its output when a second consecutive signal is emitted from the first comparator;

a second counter connected to receive inputs from the bit clock generator which causes the counter to accumulate counts;

a second digital comparator connected to receive the count output (C) from the second counter, and to compare this accumulating count against a preset test count (D) which represents the expected horizontal width of the area containing all alphanumeric characters of interest, said comparator outputting a signal when C is greater than or equal to D;

a second AND gate which receives inputs from the second digital comparator and the second D-flip flop unit, said AND gate emitting an output signal when its input's both simultaneously hold an input signal, whereby the tentative detection of a field of alphanumeric characters of interest against a clear background has been accomplished;

a second analog delay circuit connected to receive the output of the first analog delay circuit, said second circuit causing a delay of time length equal to 10 bits along a horizontal video line scan;

a second analog differential comparator connected to receive the output of the second analog delay circuit and the output of the first analog delay circuit, said second analog differential comparator outputting a signal when its input signals differ, said second differential comparator being connected to feed this output signal to the second counter and the first and second D-flip flop units whereby these respective devices are reset to restart their active functions over;

a first OR gate connected to receive the output signals from the first and second analog differential comparators, said OR gate emitting a signal when either of the signals input from said first and second comparators exist, and said output of the OR gate connected to the first counter whereby this counter is reset to the start position when a signal from the OR gate output occurs; and a third analog delay circuit connected to receive the output video signal from said first analog delay circuit, said third delay circuit causing a delay of time length equal to one horizontal video line scan.

2. An apparatus according to claim 1 wherein the means for setting a threshold comprises:

a third counter connected to receive the output of the converting means, said counter being activated to reset its count level upon the reception of an output signal from the converting means, and said counter also disposed to receive a horizontal line scan synchronizing signal from the video sensor for resetting said counter at the beginning of each TV line scan;

a decoder connected to receive the output of the converting means and the output of the third counter, said decoder serving to pass the signal from the converting means to one of a plurality of its outputs as selected by the count setting on the counter;

a plurality of sample and hold circuits, each said circuit separately connected to receive output signals from said decoder in a manner as prescribed by the count on said third counter whereby said received signals from the decoder controls activation of the sample and hold circuits, and each said sample and hold circuit being separately connected to receive the video signal from the output of the third analog delay circuit in the converting means, whereby the analog voltage level of the video signal is stored in the preselected activated sample and hold circuit; and an analog multiplexer connected to receive the outputs of each said sample and hold circuits, and connected to receive control signals from the means for storing the horizontal and vertical coordinates, said multiplexer outputting the video voltage level signal from the proper sample and hold circuit when directed by the received control signal from the storing means.

3. An apparatus according to claim 2 wherein the means for storing the horizontal and vertical coordinates representing the location of each possible bounded area containing alphanumeric characters comprises:

a fourth counter connected to receive the horizontal line scan synchronizing signal from the video sensor for incrementing said counter one count at the beginning of each TV line scan;

a first RAM connected to receive and store the output count of the fourth counter, and connected to receive the output signal from the second AND gate within the presearching means which, when received, causes the last stored count in said counter to be outputted to the means for locating the bounded area containing alphanumeric characters;

a fifth counter connected to receive the output of the bit clock generator for causing said counter to index counts related to the linear position on a horizontal TV scan line, and connected to receive the horizontal line scan synchronizing signal from the video sensor for resetting said counter to restart at the beginning of each horizontal TV scan line;

a subtractor connected to receive the count from said fifth counter and also connected to receive the output signal from the second AND gate within the presearching means, said subtractor causing the preset test count D to be subtracted from the count in said fifth counter upon the receipt of the output signal from the second AND gate;

a second RAM connected to receive the output count from the subtractor, said RAM storing the count which represents the horizontal position of the left edge of the bounded area containing alphanumeric characters;

a third digital comparator connected to receive the output of the second RAM, this output being the last count (F) stored in the second RAM, and connected to receive the accumulated count of the fifth counter (E), said third comparator outputting a signal when E=F with one connection of this output back to the second RAM whereby said RAM is address incremented upon the occurrence of the output signal; and a sixth counter connected to the output of the third digital comparator whereby said counter is indexed one count for each signal emitted by the third digital comparator, said counter also connected to receive the horizontal line scan synchronizing signal from the video sensor for resetting said counter upon receipt of this signal at the beginning of each TV line scan, and the output of said sixth counter connected to the analog multiplexer within the threshold setting means for causing the proper sample and hold circuit to be outputted through the multiplexer.

4. An apparatus according to claim 3 wherein the digitizing means comprises:

a third analog delay circuit, connected to receive the output video signal of the first analog delay circuit within the presearching means, for further delaying the input video signal for a time period equal to one horizontal video line scans; and a third analog differential comparator with one input connected to the output of the third analog delay circuit and a second input connected to the output of the means for setting a threshold, said comparator emitting a quantized digital binary signal with a logic signal of "1" for data pertaining to possible alphanumeric characters and the logic signal "0" for data caused by the background.

5. An apparatus according to claim 4 wherein the locating means comprises:

means, connected to receive quantized binary data signals from the converting means, for holding said quantized data for each bounded area scene pertaining to a possible alphanumeric character field;

means, connected to receive the output of the holding means, for multiplexing in an ordered way the signal output from said holding means; and means, connected to the multiplexing means, for controlling the multiplexing means operation, said controlling means also connected to receive data from the holding means and the converting means, to process this data and to emit control signals to the holding means.

6. An apparatus according to claim 5 wherein the locating means further comprises:

a plurality of OR gates connected between the holding means and the controlling means, said OR gates established to receive preselected groups of data output from the holding means, and to emit a resultant signal to the controlling means.

7. An apparatus according to claim 6 wherein the holding means comprises:

a third RAM connected to the output of the converting means to receive and store each bounded scene of quantized video data, said RAM also connected to the controlling means for receiving command signals;

an address encoder connected to receive counts from the bit clock generator; and an address selector connected to receive data and command signals from the controlling means, said address selector connected to output address data to the third RAM when commanded by the controlling means.

8. An apparatus according to claim 7 wherein the controlling means comprises:

a microcomputer.

9. An apparatus according to claim 8 wherein the recognizing means comprises:

an electrooptical processor (EOP) connected to receive from the multiplexing means prearranged streams of the quantized data; and a correlation peak detector connected to the output of the electro-optical processor.

10. An apparatus according to claim 9 wherein the EOP comprises:

a first summing circuit which is connected to the output for multiplexing means, said summing circuit sums the quantized data elements;

an averaging circuit to divide the first summing circuits output by a preset number representing the total elements of data in the scene area containing an alphanumeric character;

a digital delay circuit connected to the output of the multiplexing means, said delay circuit causing a delay to the data stream equal to the present number which is the divisor for the averaging circuit;

a second summing circuit connected to the outputs of the averaging circuit and the digital delay circuit, and also connected to receive a preset bias signal, said second summing circuit preset to combine these signals in a preselected manner;

a light emitting diode (LED) connected to the output of the second summing circuit, said LED converting the electrical signal into a scanning light signal;

a mask fixed to intercept the scanning light signal emitted by the LED, said mask constructed with a preselected arrangement of transparent openings to allow the passage of the scanning light signal in a manner that maximum intensity occurs when the opening arrangements correspond with peaks in the scanning light signal;

a charged coupled device (CCD) positioned behind the work mask opposite the LED, said CCD disposed to receive the transmitted light signals whereby the transmitted light intensity is measured and electrically stored; and a shift register connected to the CCD to collect accumulated electrical signals of preselected groups of openings in the preselected arrangement of transparent openings which represent the light intensity of these groups in the CCD.

11. An apparatus according to claim 10 wherein the correlation peak detector comprises:

an analog to digital (A/D) converter connected to receive and convert the analog signal output from the shift register;

means, connected to receive the digitized signal from the A/D converter, for determining the preselected group of openings whose accumulated signal has the highest correlation level; and means, connected to the determining means and the EOP for identifying which alphanumeric character is associated with the preselected group of openings showing the highest correlated signal level.

12. An apparatus according to claim 11 wherein the determining means comprises:

a sixth counter connected to receive a horizontal clock pulse signal from the EOP;

a fourth digital comparator connected to receive the output count (G) from the sixth counter and a preset count level (H), said comparator emitting at its output a command signal when G=H;

a first latch connected to the output of the A/D converter and to the output of the fourth digital comparator, said latch commanded to the hold output signal of the A/D converter by the output command signal from said fourth digital comparator;

a digital subtractor with inputs connected to the outputs of the first latch and the A/D converter, said digital subtractor removing from the digitized signal emitted at the output of the A/D converter a preset amount of signal;

a second latch connected to the output of the digital subtractor, said second latch storing the output of the digital subtractor until commanded to restore a newer output value from the digital subtractor;

a fifth digital comparator connected to receive the real time output count value (J) from the digital subtractor and to receive the output count value (K) stored in the second latch, said comparator emitting a control signal at its output when J is greater than K, said control signal output connected to the second latch for providing the command for storing the newer output value (J) from the digital subtractor;

a sixth digital comparator connected at its inputs to receive the output count value (K) of the second latch and a preset minimum limit level value (L), said comparator emitting at its output a control signal; and a third latch connected to receive the count (G) from the sixth counter, and connected to receive control signals from the outputs of the fifth and sixth comparators, said control signal from the sixth comparator causing said latch to be unable to emit through its output any data signal when K is less than L, and said control signal from the fifth comparator commanding said latch to output the data count if not inhibited by the sixth comparator control.

13. An apparatus according to claim 1 wherein the locating means comprises:

means, connected to receive quantized binary data signals from the converting means, for holding said quantized data for each bounded area scene pertaining to a possible alphanumeric character field;

means, connected to receive the output of the holding means, for multiplexing in an ordered way the signal output from said holding means; and means, connected to the multiplexing means, for controlling the multiplexing means operation, said controlling means also connected to receive data from the holding means and the converting means, to process this data and to emit control signals to the holding means.

14. An apparatus according to claim 13 wherein the recognizing means comprises:

an electrooptical processor (EOP) connected to receive from the multiplexing means prearranged streams of the quantized data; and a correlation peak detector connected to the output of the electro-optical processor.

15. An apparatus according to claim 14 wherein the EOP comprises:

a first summing circuit which is connected to the output of the multiplexing means, said summing circuit sums the quantized data elements;

an averaging circuit to divide the first summing circuits output by a preset number representing the total elements of data in the scene area containing an alphanumeric character;

a digital delay circuit connected to the output of the multiplexing means, said delay circuit causing a delay to the data stream equal to the preset number which is the divisor for the averaging circuit;

a second summing circuit connected to the outputs of the averaging circuit and the digital delay circuit, and also connected to receive a preset bias signal, said second summing circuit preset to combine these signals in a preselected manner;

a light emitting diode (LED) connected to the output of the second summing circuit, said LED converting the electrical signal into a scanning light signal;

a mask fixed to intercept the scanning light signal emitted by the LED, said mask constructed with a preselected arrangement of transparent openings to allow the passage of the scanning light signal in a manner that maximum intensity occurs when the opening arrangements correspond with peaks in the scanning light signal;

a charged coupled device (CCD) positioned behind the work mask opposite the LED, said CCD disposed to receive the transmitted light signals whereby the transmitted light intensity is measured and electrically stored; and a shift register connected to the CCD to collect accumulated electrical signals of preselected groups of openings in the preselected arrangement of transparent openings which represent the light intensity of these groups in the CCD.

16. An apparatus according to claim 15 wherein the correlation peak detector comprises:

an analog to digital (A/D) converter connected to receive and convert the analog signal output from the shift register;

means, connected to receive the digitized signal from the A/D converter, for determining the preselected group of openings whose accumulated signal has the highest correlation level; and means, connected to the determining means and the EOP for identifying which alphanumeric character is associated with the preselected group of openings showing the highest correlated signal level.

17. An apparatus according to claim 16 wherein the determining means comprises:

a sixth counter connected to receive a horizontal clock pulse signal from the EOP;

a fourth digital comparator connected to receive the output count (G) from the sixth counter and a preset count level (H), said comparator emitting at its output a command signal when G=H;

a first latch connected to the output of the A/D converter and to the output of the fourth digital comparator, said latch commanded to hold the output signal of the A/D converter by the output command signal from said fourth digital comparator;

a digital subtractor with inputs connected to the outputs of the first latch and the A/D converter, said digital subtractor removing from the digitized signal emitted at the output of the A/D converter a preset amount of signal;

a second latch connected to the output of the digital subtractor, said second latch storing the output of the digital subtractor until commanded to restore a newer output value from the digital subtractor;

a fifth digital comparator connected to receive the real time output count value (J) from the digital subtractor and to receive the output count value (K) stored in the second latch, said comparator emitting a control signal at its output when J is greater than K, said control signal output connected to the second latch for providing the command for storing the newer output value (J) from the digital subtractor;

a sixth digital comparator connected at its inputs to receive the output count value (K) of the second latch and a preset minimum limit level value (L), said comparator emitting at its output a control signal; and a third latch connected to receive the count (G) from the sixth counter, and connected to receive control signals from the outputs of the fifth and sixth comparators, said control signal from the sixth comparator causing said latch to be unable to emit through its output any data signal when K is less than L, and said control signal from the fifth comparator commanding said latch to output the data count if not inhibited by the sixth comparator control.

18. An apparatus according to claim 1 wherein the recognizing means comprises:

an electrooptical processor (EOP) connected to receive from the multiplexing means prearranged streams of the quantized data; and a correlation peak detector connected to the output of the electro-optical processor.

19. An apparatus according to claim 18 further including:

said threshold setting means which adjusts a threshold reference signal to relate in an absolute manner to analog signals pertaining to probable alphanumeric characters in a manner that possible alphanumeric characters are always treated similarly in relation to the background level whether the alphanumeric characters are light colored on a dark background or dark colored on a light background; and an analog comparator as the digitizing means, said analog comparator outputing a digital logic binary signal of "1" for data pertaining to alphanumeric characters and a digital logic signal of "0" for data caused by background signals.

20. An apparatus according to claim 19 wherein the presearching means comprises:

an input for receiving video signals from the video sensor;

a bit clock generator;

a first analog delay circuit connected to receive the video sensor input, said delay circuit causing a delay of time length equal to one horizontal video line scan;

a first analog differential comparator which receives input signals from the first analog delay circuit and from the video sensor input, said comparator outputting a signal when the input signals differ;

a first AND gate which receives one input from the bit clock generator and a second input from the output of the first analog differential comparator, said AND gate emitting an output signal when signals occur simultaneously at both inputs;

a first counter connected to receive the output of the first AND gate, said counter accumulating a total count representing the period during which the first AND gate is outputting a pulsed signal;

a first digital comparator connected to receive the count output (A) from the first counter and to compare this accumulating count against a preset test count (B) which represents the expected horizontal width of a single alphanumeric character, said comparator outputting a signal when A is less than or equal to B;

a first D-flip flop unit connected to receive the output signal from the first digital comparator, said flip flop unit outputs a signal after it has been triggered by a first output signal from the first digital converter;

a second D-flip flop unit connected to receive the output of the first D-flip flop unit and to receive the output signals from the first digital comparator, said second D-flip flop unit being activated by the output signal from the first D-flip flop unit which occurs when the first flip flop unit is activated by the first output signal emitted from the first comparator, and then is caused to emit a signal at its output when a second consecutive signal is emitted from the first comparator;

a second counter connected to receive inputs from the bit clock generator which causes the counter to accumulate counts;

a second digital comparator connected to receive the count output (C) from the second counter, and to compare this accumulating count against a preset test count (D) which represents the expected horizontal width of the area containing all alphanumeric characters of interest, said comparator outputting a signal when C is greater than or equal to D;

a second AND gate which receives inputs from the second digital comparator and the D-flip flop unit, said AND gate emitting an output signal when its input's both simultaneously hold an input signal, whereby the tentative detection of a field of alphanumeric characters of interest against a clear background has been accomplished;

a second analog delay circuit connected to receive the output of the first analog delay circuit, said second circuit causing a delay of time length equal to 10 bits along a horizontal video line scan;

a second analog differential comparator connected to receive the output of the second analog delay circuit and the output of the first analog delay circuit, said second analog differential comparator outputting a signal when its input signals differ, said second differential comparator being connected to feed this output signal to the second counter and the first and second D-flip flop units whereby these respective devices are reset to restart their active functions over;

a first OR gate connected to receive the output signals from the first and second analog differential comparators, said OR gate emitting a gate signal when either of the signals input from said first and second comparators exist, and said output of the OR gate connected to the first counter whereby this counter is reset to the start position when a signal from the OR gate output occurs; and a third analog delay circuit connected to receive the output video signal from said first analog delay circuit, said third delay circuit causing a delay of time length equal to one horizontal video line scan.

21. An apparatus according to claim 20 wherein the means for setting a threshold comprises:

a third counter connected to receive the output of the converting means, said counter being activated to reset its count level upon the reception of an output signal from the converting means, and said counter also disposed to receive a horizontal line scan synchronizing signal from the video sensor for resetting said counter at the beginning of each TV line scan;

a decoder connected to receive the output of the converting means and the output of the third counter, said decoder serving to pass the signal from the converting means to one of a plurality of its outputs as selected by the count setting on the counter;

a plurality of sample and hold circuits, each said circuit separately connected to receive output signals from said decoder in a manner as prescribed by the count on said third counter whereby said received signals from the decoder controls activation of the sample and hold circuits, and each said sample and hold circuit being separately connected to receive the video signal from the output of the third analog delay circuit in the converting means, whereby the analog voltage level of the video signal is stored in the preselected activated sample and hold circuit; and an analog multiplexer connected to receive the outputs of each said sample and hold circuits, and connected to receive control signals from the means for storing the horizontal and vertical coordinates, said multiplexer outputting the video voltage level signal from the proper sample and hold circuit when directed by the received control signal from the storing means.

22. An apparatus according to claim 21 wherein the means for storing the horizontal and vertical coordinates representing the location of each possible bounded area containing alphanumeric characters comprises:

a fourth counter connected to receive the horizontal line scan synchronizing signal from the video sensor for incrementing said counter one count at the beginning of each TV line scan;

a first RAM connected to receive and store the output count of the fourth counter, and connected to receive the output signal from the second AND gate within the presearching means which, when received, causes the last stored count in said counter to be outputted to the means for locating the bounded area containing alphanumeric characters;

a fifth counter connected to receive the output of the bit clock generator for causing said counter to index counts related to the linear position on a horizontal TV scan line, and connected to receive the horizontal line scan synchronizing signal from the video sensor for resetting said counter to restart at the beginning of each horizontal TV scan line;

a subtractor connected to receive the count from said fifth counter and also connected to receive the output signal from the second AND gate within the presearching means, said subtractor causing the preset test count D to be subtracted from the count in said fifth counter upon the receipt of the output signal from the second AND gate;

a second RAM connected to receive the output count from the subtractor, said RAM storing the count which represents the horizontal position of the left edge of the bounded area countaing alphanumeric characters;

a third digital comparator connected to receive the output of the second RAM, this output being the last count (F) stored in the second RAM, and connected to receive the accumulated count of the fifth counter (E), said third comparator outputting a signal when E=F with one connection of this output back to the second RAM whereby said RAM is address incremented upon the occurrence of the output signal; and a sixth counter connected to the output of the third digital comparator whereby said counter is indexed one count for each signal emitted by the third digital comparator, said counter also connected to receive the horizontal line scan synchronizing signal from the video sensor for resetting said counter upon receipt of this signal at the begining of each TV line scan, and the output of said sixth counter connected to the analog multiplexer within the threshold setting means for causing the proper sample and hold circuit to be outputted through the multiplexer.

23. An apparatus according to claim 22 wherein the digitizing means comprises:

a third analog delay circuit, connected to receive the output video signal of the first analog delay circuit within the presearching means, for further delaying the input video signal for a time period equal to one horizontal video line scans; and a third analog differential comparator with one input connected to the output of the third analog delay circuit and a second input connected to the output of the means for setting a threshold, said comparator emitting a quantized digital binary signal with a logic signal of "1" for data pertaining to possible alphanumeric characters and the logic signal of "0" for data caused by the background;

output of the fourth digital comparator, said latch commanded to hold the output signal of the A/D converter by the output command signal from said fourth digital comparator;

a digital subtractor with inputs connected to the outputs of the first latch and the A/D converter, said digital subtractor removing from the digitized signal emitted at the output of the A/D converter a preset amount of signal;

a second latch connected to the output of the digital subtractor, said second latch storing the output of the digital subtractor until commanded to restore a newer output value from the digital subtractor;

a fifth digital comparator connected to receive the real time output count value (J) from the digital subtractor and to receive the output count value (K) stored in the second latch, said comparator emitting a control signal at its output when J is greater than K, said control signal output connected to the second latch for providing the command for storing the newer output value (J) from the digital subtractor;

a sixth digital comparator connected at its inputs to receive the output count value (K) of the second latch and a preset minimum limit level value (L), said comparator emitting as its output a control signal; and a third latch connected to receive the count (G) from the sixth counter, and connected to receive control signals from the outputs of the fifth and sixth comparators, said control signal from the sixth comparator causing said latch to be unable to emit through its output any data signal when K is less than L, and said control signal from the fifth comparator commanding said latch to output the data count if not inhibited by the sixth comparator control.

24. An apparatus according to claim 23 wherein the EOP comprises:

a first summing circuit which is connected to the output of the multiplexing means, said summing circuit sums the quantized data elements;

an averaging circuit to divide the first summing circuits output by a preset number representing the total elements of data in the scene area containing an alphanumeric character;

a digital delay circuit connected to the output of the multiplexing means, said delay circuit causing a delay to the data stream equal to the present number which is the divisor for the averaging circuit;

a second summing circuit connected to the outputs of the averaging circuit and the digital delay circuit, and also connected to receive a preset bias signal, said second summing circuit preset to combine these signals in a preselected manner;

a light emitting diode (LED) connected to the output of the second summing circuit, said LED converting the electrical signal into a scanning light signal;

a mask fixed to intercept the scanning light signal emitted by the LED, said mask constructed with a preselected arrangement of transparent openings to allow the passage of the scanning light signal in a manner that maximum intensity occurs when the opening arrangements correspond with peaks in the scanning light signal;

a charged coupled device (CCD) positioned behind the work mask opposite the LED, said CCD disposed to receive the transmitted light signals whereby the transmitted light intensity is measured and electrically stored; and a shift register connected to the CCD to collect accumulated electrical signals of preselected groups of openings in the preselected arrangement of transparent openings which represent the light intensity of these groups in the CCD.

25. An apparatus according to claim 24 wherein the correlation peak detector comprises:

an analog to digital (A/D) converter connected to receive and convert the analog signal output from the shift register;

means, connected to receive the digitized signal from the A/D converter, for determining the preselected group of openings whose accumulated signal has the highest correlation level; and means, connected to the determining means and the EOP for identifying which alphanumeric character is associated with the preselected group of openings showing the highest correlated signal level.

26. An apparatus according to claim 25 wherein the determining means comprises:

a sixth counter connected to receive a horizontal clock pulse signal from the EOP;

a fourth digital comparator connected to receive the output count (G) from the sixth counter and a preset count level (H), said comparator emitting at its output a command signal when G=H;

a first latch connected to the output of the A/D converter and to the output of the fourth digital comparator, said latch commanded to hold the output signal of the A/D converter by the output command signal from said fourth digital comparator;

a digital subtractor with inputs connected to the outputs of the first latch and the A/D converter, said digital subtractor removing from the digitized signal emitted at the output of the A/D converter a preset amount of signal;

a second latch connected to the output of the digital subtractor, said second latch storing the output of the digital subtractor until commanded to restore a newer output value from the digital subtractor;

a fifth digital comparator connected to receive the real time output count value (J) from the digital subtractor and to receive the output count value (K) stored in the second latch, said comparator emitting a control signal at its output when J is greater than K, said control signal output connected to the second latch for providing the command for storing the newer output value (J) from the digital subtractor;

a sixth digital comparator connected at its inputs to receive the output count value (K) of the second latch and a preset minimum limit level value (L), said comparator emitting at its output a control signal; and a third latch connected to receive the count (G) from the sixth counter, and connected to receive control signals from the outputs of the fifth and sixth comparators, said control signal from the sixth comparator causing said latch to be unable to emit through its output any data signal when K is less than L, and said control signal from the fifth comparator commanding said latch to output the data count if not inhibited by the sixth comparator control.

27. An apparatus according to claim 1 wherein the locating means comprises:

means, connected to receive quantized binary data signals from the converting means, for holding said quantized data for each bounded area scene pertaining to a possible alphanumeric character field;

means, connected to receive the output of the holding means, for multiplexing in an ordered way the signal output from said holding means; and means, connected to the multiplexing means, for controlling the multiplexing means operation, said controlling means also connected to receive data from the holding means and the converting means, to process this data and to emit control signals to the holding means.

28. An apparatus according to claim 27 wherein the recognizing means comprises:

an electrooptical processor (EOP) connected to receive from the multiplexing means prearranged streams of the quantized data; and a correlation peak detector connected to the output of the electro-optical processor.

29. An apparatus according to claim 28 wherein the locating means further comprises:

a plurality of OR gates connected between the holding means and the controlling means, said OR gates established to receive preselected groups of data output from the holding means, and to emit a resultant signal to the controlling means.

30. An apparatus according to claim 29 wherein the holding means comprises:

a third RAM connected to the output of the converting means to receive and store each bounded scene of quantized video data, said RAM also connected to the controlling means for receiving command signals;

an address encoder connected to receive counts from the bit clock generator; and an address selector connected to receive data and command signals from the controlling means, said address selector connected to output address data to the third RAM when commanded by the controlling means.

31. An apparatus according to claim 30 wherein the controlling means comprises:

a microcomputer.

32. An apparatus according to claim 31 wherein the EOP comprises:

a first summing circuit which is connected to the output of the multiplexing means, said summing circuit sums the quantized data elements;

an averaging circuit to divide the first summing circuits output by a preset number representing the total elements of data in the scene area containing an alphanumeric character;

a digital delay circuit connected to the output of the multiplexing means, said delay circuit causing a delay to the data stream equal to the preset number which is the divisor for the averaging circuit;

a second summing circuit connected to the outputs of the averaging circuit and the digital delay circuit, and also connected to receive a preset bias signal, said second summing circuit preset to combine these signals in a preselected manner;

a light emitting diode (LED) connected to the output of the second summing circuit, said LED converting the electrical signal into a scanning light signal;

a mask fixed to intercept the scanning light signal emitted by the LED, said mask constructed with a preselected arrangement of transparent openings to allow the passage of the scanning light signal in a manner that maximum intensity occurs when the opening arrangements correspond with peaks in the scanning light signal;

a charged coupled device (CCD) positioned behind the work mask opposite the LED, said CCD disposed to receive the transmitted light signals whereby the transmitted light intensity is measured and electrically stored; and a shift register connected to the CCD to collect accumulated electrical signals of preselected groups of openings in the preselected arrangement of transparent openings which represent the light intensity of these groups in the CCD.

33. An apparatus according to claim 32 wherein the correlation peak detector comprises:

an analog to digital (A/D) converter connected to receive and convert the analog signal output from the shift register;

means, connected to receive the digitized signal from the A/D converter, for determining the preselected group of openings whose accumulated signal has the highest correlation level; and means, connected to the determining means and the EOP for identifying which alphanumeric character is associated with the preselected group of openings showing the highest correlated signal level.

34. An apparatus according to claim 33 wherein the determining means comprises:

a sixth counter connected to receive a horizontal clock pulse signal from the EOP;

a fourth digital comparator connected to receive the output count (G) from the sixth counter and a preset count level (H), said comparator emitting at its output a command signal when G=H;

a first latch connected to the output of the A/D converter and to the output of the fourth digital comparator, said latch commanded to hold the output signal of the A/D converter by the output command signal from said fourth digital comparator;

a digital subtractor with inputs connected to the outputs of the first latch and the A/D converter, said digital subtractor removing from the digitized signal emitted at the output of the A/D converter a preset amount of signal;

a second latch connected to the output of the digital subtractor, said second latch storing the output of the digital subtractor until commanded to restore a newer output value from the digital subtractor;

a fifth digital comparator connected to receive the real time output count value (J) from the digital subtractor and to receive the output count value (K) stored in the second latch, said comparator emitting a control signal at its output when J is greater than K, said control signal output connected to the second latch for providing the command for storing the newer output value (J) from the digital subtractor;

a sixth digital comparator connected at its inputs to receive the output count value (K) of the second latch and a preset minimum limit level value (L), said comparator emitting at its output a control signal; and a third latch connected to receive the count (G) from the sixth counter, and connected to receive control signals from the outputs of the fifth and sixth comparators, said control signal from the sixth comparator causing said latch to be unable to emit through its output any data signal when K is less than L, and said control signal from the fifth comparator commanding said latch to output the data count if not inhibited by the sixth comparator control.

35. An apparatus according to claim 1 wherein the recognizing means comprises:

an electrooptical processor (EOP) connected to receive from the multiplexing means prearranged streams of the quantized data; and a correlation peak detector connected to the output of the electro-optical processor.

36. An apparatus according to claim 35 wherein the converting means comprises:

means, disposed to receive the analog video signal from the video sensor, for presearching the scene viewed to locate probable bounded areas containing alphanumeric characters, wherein said means for presearching identifies horizontal and vertical coordinates representing the location of each probable bounded area containing alphanumeric characters;

means, connected to receive a signal from the output of the presearching means, for setting a threshold to represent the background signal level;

means, connected to the presearching means, for storing the horizontal and vertical coordinates representing the location of each probable bounded area containing alphanumeric characters; and means, connected to receive the analog video signal from the video sensor and also connected to receive the output analog signal from the threshold setting means, for digitizing those signals pertaining to probable bounded areas containing alphanumeric characters in a manner that signals pertaining to alphanumeric characters are set at a first binary coded signal level and the background signals are set at the second binary coded signal level.

37. An apparatus according to claim 36 wherein the locating means comprises:

means, connected to receive quantized binary data signals from the converting means, for holding said quantized data for each bounded area scene pertaining to a possible alphanumeric character field;

means, connected to receive the output of the holding means, for multiplexing in an ordered way the signal output from said holding means; and means, connected to the multiplexing means, for controlling the multiplexing means operation, said controlling means also connected to receive data from the holding means and the converting means, to process this data and to emit control signals to the holding means.

38. An apparatus according to claim 37 further including:

said threshold setting means which adjusts a threshold reference signal to relate in an absolute manner to analog signals pertaining to probable alphanumeric characters in a manner that possible alphanumeric characters are always treated similarly in relation to the background level whether the alphanumeric characters are light colored on a dark background or dark colored on a light background; and an analog comparator as the digitizing means, said analog comparator outputting a digital logic binary signal of "1" for data pertaining to alphanumeric characters and a digital logic signal of "0" for data caused by background signals.

39. An apparatus according to claim 38 wherein the locating means further comprises:

a plurality of OR gates connected between the holding means and the controlling means, said OR gates established to receive preselected groups of data output from the holding means, and to emit a resultant signal to the controlling means.

40. An apparatus according to claim 39 wherein the presearching means comprises:

an input for receiving video signals from the video sensor;

a bit clock generator;

a first analog delay circuit connected to receive the video sensor input, said delay circuit causing a delay of time length equal to one horizontal video line scan;

a first analog differential comparator which receives input signals from the first analog delay circuit and from the video sensor input, said comparator outputting a signal when the input signals differ;

a first AND gate which receives one input from the bit clock generator and a second input from the output of the first analog differential comparator, said AND gate emitting an output signal when signals occur simultaneously at both inputs;

a first counter connected to receive the output of the first AND gate, said counter accumlating a total count representing the period during which the first AND gate is outputting a pulsed signal;

a first digital comparator connected to receive the count output (A) from the first counter and to compare this accumulating count against a preset test count (B) which represents the expected horizontal width of a single alphanumeric character, said comparator outputting a signal when A is less than or equal to B;

a first D-flip flop unit connected to receive the output signal from the first digital comparator, said flip flop unit outputs a signal after it has been triggered by a first output signal from the first digital converter;

a second D-flip flop unit connected to receive the output of the first D-flip flop unit and to receive the output signals from the first digital comparater, said second D-flip flop unit being activated by the output signal from the first D-flip flop unit which occurs when the first flip flop unit is activated by the first output signal emitted from the first comparator, and then is caused to emit a signal at its output when a second consecutive signal is emitted from the first comparater;

a second counter connected to receive inputs from the bit clock generator which causes the counter to accumulate counts;

a second digital comparator connected to receive the count output (C) from the second counter, and to compare this accumulating count against a preset test count (D) which represents the expected horizontal width of the area containing all alphanumeric characters of interest, said comparator outputting a signal when C is greater than or equal to D;

a second AND gate which receives inputs from the second digital comparator and the second D-flip flop unit, said AND gate emitting an output signal when its input's both simultaneously hold an input signal, whereby the tentative detection of a field of alphanumeric characters of interest against a clear background has been accomplished;

a second analog delay circuit connected to receive the output of the first analog delay circuit, said second circuit causing a delay of time length equal to 10 bits along a horizontal video line scan;

a second analog differential comparator connected to receive the output of the second analog delay circuit and the output of the first analog delay circuit, said second analog differential comparator outputting a signal when its input signals differ, said second differential comparator being connected to feed this output signal to the second counter and the first and second D-flip flop units whereby these respective devices are reset to restart their active functions over;

a first OR gate connected to receive the output signals from the first and second analog differential comparators, said OR gate emitting a signal when either of the signals input from said first and second comparators exist, and said output of the OR gate connected to the first counter whereby this counter is reset to the start position when a signal from the OR gate output occurs; and a third analog delay circuit connected to receive the output video signal from said first analog delay circuit, said third delay circuit causing a delay of time length equal to one horizontal video line scan.

41. An apparatus according to claim 40 wherein the means for setting a threshold comprises:

a third counter connected to receive the output of the converting means, said counter being activated to reset its count level upon the reception of an output signal from the converting means, and said counter also disposed to receive a horizontal line scan synchronizing signal from the video sensor for resetting said counter at the beginning of each TV line scan;

a decoder connected to receive the output of the converting means and the output of the third counter, said decoder serving to pass the signal from the converting means to one of a plurality of its outputs as selected by the count setting on the counter;

a plurality of sample and hold circuits, each said circuit separately connected to receive output signals from said decoder in a manner as prescribed by the count on said third counter whereby said received signals from the decoder controls activation of the sample and hold circuits, and each said sample and hold circuit being separately connected to receive the video signal from the output of the third analog delay circuit in the converting means, whereby the analog voltage level of the video signal is stored in the preselected activated sample and hold circuit; and an analog multiplexer connected to receive the outputs of each said sample and hold circuits, and connected to receive control signals from the means for storing the horizontal and vertical coordinates, said multiplexer outputting the video voltage level signal from the proper sample and hold circuit when directed by the received control signal from the storing means.

42. An apparatus according to claim 41 wherein the means for storing the horizontal and vertical coordinates representing the location of each possible bounded area containing alphanumeric characters comprises:

a fourth counter connected to receive the horizontal line scan synchronizing signal from the video sensor for incrementing said counter one count at the beginning of each TV line scan;

a first RAM connected to receive and store the output count of the fourth counter, and connected to receive the output signal from the second AND gate within the presearching means which, when received, causes the last stored count in said counter to be outputted to the means for locating the bounded area containing alphanumeric characters;

a fifth counter connected to receive the output of the bit clock generator for causing said counter to index counts related to the linear position on a horizontal TV scan line, and connected to receive the horizontal line scan synchronizing signal from the video sensor for resetting said counter to restart at the beginning of each horizontal TV scan line;

a subtractor connected to receive the count from said fifth counter and also connected to receive the output signal from the second AND gate within the presearching means, said subtractor causing the preset test count D to be subtracted from the count in said fifth counter upon the receipt of the output signal from the second AND gate;

a second RAM connected to receive the output count from the subtractor, said RAM storing the count which represents the horizontal position of the left edge of the bounded area countaing alphanumeric characters;

a third digital comparator connected to receive the output of the second RAM, this output being the last count (F) stored in the second RAM, and connected to receive the accumulated count of the fifth counter (E), said third comparator outputting a signal when E=F with one connection of this output back to the second RAM whereby said RAM is address incremented upon the occurrence of the output signal; and a sixth counter connected to the output of the third digital comparator whereby said counter is indexed one count for each signal emitted by the third digital comparator, said counter also connected to receive the horizontal line scan synchronizing signal from the video sensor for resetting said counter upon receipt of this signal at the beginning of each TV line scan, and the output of said sixth counter connected to the analog multiplexer within the threshold setting means for causing the proper sample and hold circuit to be outputted through the multiplexer.

43. An apparatus according to claim 42 wherein the digitizing means comprises:

a third analog delay circuit, connected to receive the output video signal of the first analog delay circuit within the presearching means, for further delaying the input video signal for a time period equal to one horizontal video line scans; and a third analog differential comparator with one input connected to the output of the third analog delay circuit and a second input connected to the output of the means for setting a threshold, said comparator emitting a quantized digital binary signal with a logic signal of "1" for data pertaining to possible alphanumeric characters and the logic signal of "0" for data caused by the background.

44. An apparatus according to claim 43 wherein the holding means comprises:

a third RAM connected to the output of the converting means to receive and store each bounded scene of quantized video data, said RAM also connected to the controlling means for receiving command signals;

an address encoder connected to receive counts from the bit clock generator; and an address selector connected to receive data and command signals from the controlling means, said address selector connected to output address data to the third RAM when commanded by the controlling means.

45. An apparatus according to claim 44 wherein the controlling means comprises:

a microcomputer.

* * * * *